(12) United States Patent
White, Jr. et al.

(10) Patent No.: US 12,536,552 B2
(45) Date of Patent: Jan. 27, 2026

(54) HUMANOID SYSTEM FOR AUTOMATED CUSTOMER SUPPORT

(71) Applicant: Cisco Technology, Inc., San Jose, CA (US)

(72) Inventors: David C. White, Jr., St. Petersburg, FL (US); Jay K. Johnston, Raleigh, NC (US); Magnus Mortensen, Cary, NC (US); Christopher Shaun Roberts, Spring, TX (US); Kevin D. McCabe, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 91 days.

(21) Appl. No.: 18/497,103

(22) Filed: Oct. 30, 2023

(65) Prior Publication Data

US 2024/0135388 A1 Apr. 25, 2024
US 2024/0232906 A9 Jul. 11, 2024

Related U.S. Application Data

(63) Continuation of application No. 17/079,747, filed on Oct. 26, 2020, now Pat. No. 11,875,362.
(Continued)

(51) Int. Cl.
*G06Q 30/016* (2023.01)
*G06Q 10/0639* (2023.01)
(Continued)

(52) U.S. Cl.
CPC ..... *G06Q 30/016* (2013.01); *G06Q 10/06395* (2013.01); *H04L 51/02* (2013.01); *G06Q 10/103* (2013.01)

(58) Field of Classification Search
CPC . G06Q 30/016; G06F 11/079; G06F 11/0778; G06F 11/0706; G06F 11/3438; G06F 11/3698; G06F 9/50
(Continued)

(56) References Cited

U.S. PATENT DOCUMENTS 7,191,364 B2 * 3/2007 Hudson ............... G06F 11/0793
717/124
10,410,626 B1 9/2019 Sherstinsky et al.
(Continued)

FOREIGN PATENT DOCUMENTS

CN 109783510 A 5/2019
FR 2990282 A1 * 11/2013 .......... G06F 11/3438
(Continued)

OTHER PUBLICATIONS

English translation (Year: 2013).*
(Continued)

*Primary Examiner* — William S Brockington, III
*Assistant Examiner* — Letoria G Knight
(74) *Attorney, Agent, or Firm* — Edell, Shapiro & Finnan, LLC

(57) ABSTRACT

A computer executed process for mimicking human dialog, referred to herein as a "humanoid" or "humanoid system," can be configured to provide automated customer support. The humanoid can identify a support issue for a customer, as well as a customer support campaign corresponding to the support issue. The humanoid can identify at least one machine learning model associated with the customer support campaign and can communicate with the customer using the at least one machine learning model. The humanoid can execute a support action to resolve the support issue.

20 Claims, 19 Drawing Sheets

Related U.S. Application Data

(60) Provisional application No. 63/051,558, filed on Jul. 14, 2020.

(51) Int. Cl.
 *H04L 51/02* (2022.01)
 *G06Q 10/10* (2023.01)

(58) Field of Classification Search
 USPC .......... 705/7.41, 305; 714/25, 38.11, 11.023, 714/11.026, 714, 38.14, 717, 124, 37, 714/38.1; 717/177
 See application file for complete search history.

(56) References Cited

U.S. PATENT DOCUMENTS

| | | | |
|---|---|---|---|
| 11,552,909 | B2 | 1/2023 | Lopes De Moraes et al. |
| 2006/0155765 | A1 | 7/2006 | Takeuchi et al. |
| 2007/0050191 | A1 | 3/2007 | Weider et al. |
| 2007/0203863 | A1 | 8/2007 | Gupta et al. |
| 2009/0162824 | A1 | 6/2009 | Heck |
| 2009/0245500 | A1 | 10/2009 | Wampler |
| 2013/0218339 | A1 | 8/2013 | Maisonnier et al. |
| 2014/0258286 | A1 | 9/2014 | Brown et al. |
| 2016/0162474 | A1 | 6/2016 | Agarwal et al. |
| 2016/0247068 | A1 | 8/2016 | Lin |
| 2017/0048170 | A1 | 2/2017 | Smullen et al. |
| 2017/0120446 | A1 | 5/2017 | Veltrop et al. |
| 2017/0308531 | A1 | 10/2017 | Ma et al. |
| 2018/0025726 | A1 | 1/2018 | Gatti De Bayser et al. |
| 2018/0131645 | A1 | 5/2018 | Magliozzi et al. |
| 2018/0145934 | A1 | 5/2018 | Pappu et al. |
| 2018/0165691 | A1* | 6/2018 | Heater ................. G06F 40/205 |
| 2018/0332170 | A1 | 11/2018 | Li et al. |
| 2018/0367483 | A1 | 12/2018 | Rodriguez et al. |
| 2019/0042988 | A1 | 2/2019 | Brown et al. |
| 2019/0108486 | A1 | 4/2019 | Jain et al. |
| 2019/0121853 | A1 | 4/2019 | Cai et al. |
| 2019/0130310 | A1 | 5/2019 | Madhava Rao et al. |
| 2019/0171845 | A1 | 6/2019 | Dotan-Cohen et al. |
| 2020/0007474 | A1 | 1/2020 | Zhang et al. |
| 2020/0099633 | A1* | 3/2020 | D'Agostino .......... G06F 3/0481 |
| 2020/0125678 | A1 | 4/2020 | Conley et al. |
| 2020/0142997 | A1 | 5/2020 | Kondadadi et al. |
| 2020/0195782 | A1 | 6/2020 | Kannan et al. |
| 2020/0259891 | A1 | 8/2020 | Abraham |
| 2020/0293946 | A1 | 9/2020 | Sachan et al. |
| 2020/0302123 | A1 | 9/2020 | Mittal et al. |
| 2020/0329144 | A1 | 10/2020 | Morgan et al. |
| 2020/0335124 | A1 | 10/2020 | Herzig et al. |
| 2021/0073653 | A1 | 3/2021 | Maes |
| 2021/0081819 | A1* | 3/2021 | Polleri ................. G06F 16/252 |
| 2021/0149788 | A1* | 5/2021 | Downie ............. G06F 11/3604 |
| 2021/0158146 | A1 | 5/2021 | Singh et al. |
| 2021/0334473 | A1 | 10/2021 | Trehan |
| 2021/0390268 | A1* | 12/2021 | Pandey ................. G06N 5/025 |

FOREIGN PATENT DOCUMENTS

| | | |
|---|---|---|
| WO | 2019144773 A1 | 8/2019 |
| WO | 2019184103 A1 | 10/2019 |

OTHER PUBLICATIONS

Diana Borsa, et al., "Observational Learning by Reinforcement Learning," https://arxiv.org/abs/1706.06617v1, Jun. 20, 2017, 10 pages.

Facebook, "Building Bots," retrieved from https://developers.facebook.com/docs/workplace/integrations/custom-integrations/bots/#bottogroupchat, Sep. 28, 2020, 12 pages.

Go, E., et al., "Humanizing chatbots: The effects of visual, identity and conversational cues on humanness perceptions," Computers in Human Behavior, https://www.sciencedirect.com/science/article/abs/pii/S0747563219300329?via%3Dihub, Aug. 2019, 13 pages.

Saama, "Deep Learning and Context Based Intelligent Search," retrieved from https://www.saama.com/deep-learning-context-based-intelligent-search/, Jan. 27, 2021, 2 pages.

Wikipedia, "Automated machine learning," https://en.wikipedia.org/wiki/Automated_machine_learning, last edited Jan. 25, 2021, 1 page.

Zarkowski, Mateusz, "Multi-party Turn-Taking in Repeated Human-Robot Interactions: An Interdisciplinary Evaluation," International Journal of Social Robotics, https://doi.org/10.1007/s12369-019-00603-1, Nov. 8, 2019, 15 pages.

Zendesk, "Answer Bot," retrieved from https://www.zendesk.com/answer-bot/, Jan. 27, 2021, 7 pages.

\* cited by examiner

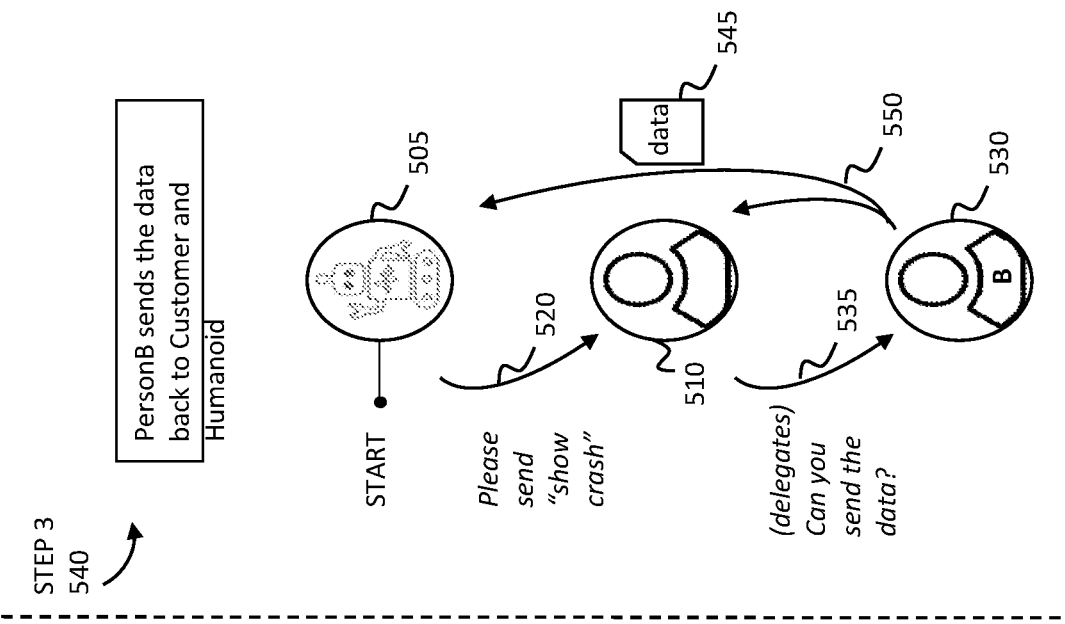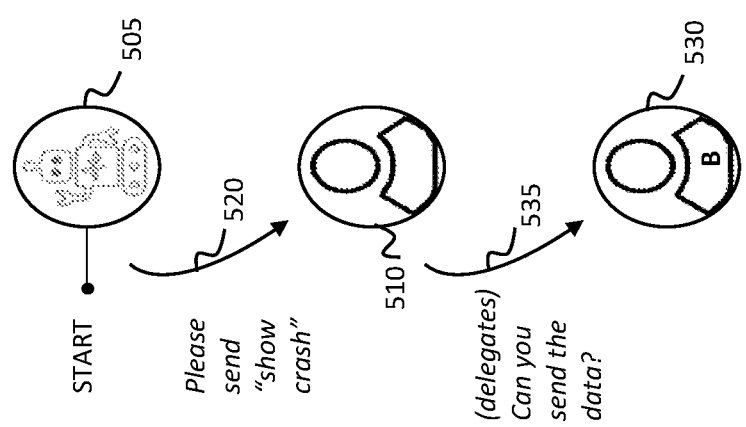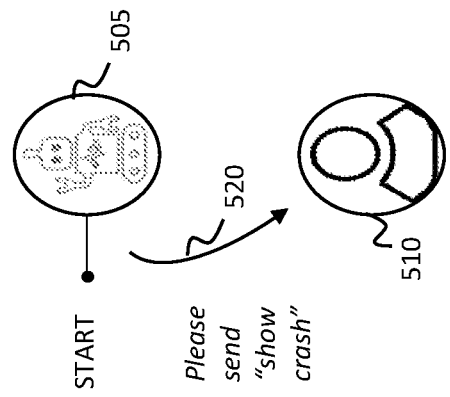
FIG. 5A

600

620

Q-1 Customer (customer@customer.com): Mon Jan 1 2020 01:01:01 GMT (EDT) −1 h 58m 20s ago
so far so good
i applied the firmware update to 9.6.4 on friday afternoon and there have been no reboots since then
i am going to monitor for another day or so myself to be sure Customer (customer@customer.com): Mon Jan 1 2020 01:01:01 GMT (EDT) −1 h 58m 20s ago

610

From: customer@customer.com
To: humanoid@company.com
Cc: operator@company.com
Subject: Support Request 6YZ123; Firmware Update to 9.6.4

So far so good. I applied the firmware update to 9.6.4 on Friday afternoon and there have been no reboots since then. I am going to monitor for another day or so myself to be sure.

615

Thanks,
Customer
t. 123-867-5309  e. customer@customer.com

-----Original Message ----

| P3 689468191 - ASA 5512 is Restarting Most Nights | 705 |
|---|---|
| Fri 10 Jul 2020 09:28am – 04:00 Humanoid Email In |  |

From: Humanoid@company.com
To: Customer@customer.com
Cc:
Subject: SR 689468191 – ASA 5512 is Restarting Most Nights Hello Customer,
My name is Humanoid, and I have ownership of your Support Request: 689468191. I am sending this email as an initial point of contact.

From your problem description, it sounds like the device might have crashed.

Log on to the CLI of the device that crashed via SSH/Telnet (Note: this may currently be the STANDBY device if you have an HA failover-pair and the rules have changed).
Run the command "term pager 0" to prevent the device from pausing the output with "—More—" prompts
Then the command "show crash" and save the output to a text file
Then reset the terminal length with "term pager 24"
Reply-all to this email and attach that file or go to
https://support.company.com/requestID=689468191 and upload the file there.

Please upload/email plain text files, not rtf and do not zip them.

I will analyze the crash file and try to determine the bug that is causing it, and how to mitigate the problem.

Sincerely,
Humanoid

2020-07-10T13:47:08.364+0000 + 0:02:07 -- BDB Event: operator- humanoid_process_asa_crash -- starting sr_id:689468191 | filename: None
2020-07-10T13:49:34.000+0000 + 0:02:25 -- BORG: BORG Found Bug CSCvi16029 while running 9.4(4)17
------BORG ran on file with crash. Found Crash Bug------
2020-07-10T13:52:12.000+0000 + 0:02:38 -- BORG: BORG Found Bug CSCvi16029 while running 9.4(4)17
------BORG ran on file with crash. Found Crash Bug------
2020-07-10T13:53:07.694+0000 + 0:00:55 -- BDB Event: operator-- humanoid_process_asa_crash -- starting sr_id:689468191 | filename: None
2020-07-10T13:53:11.453+0000 + 0:00:03 -- BDB Event: operator-- humanoid_process_asa_crash -- Owner: humanoid
2020-07-10T13:53:11.454+0000 + 0:00:00 -- BDB Event: operator - humanoid_process_asa_crash -- SubTech: ASA non-VPN problem
2020-07-10T13:53:11.454+0000 + 0:00:00 -- BDB Event: operator-- humanoid_process_asa_crash -- actions so far: {'_id':689468191; 'sent_crash_request':
datetime.datetime(2020, 7, 10, 13, 28, 52, 256000)}
2020-07-10T13:53:15.761+0000 + 0:00:04 -- BDB Event: operator-- humanoid_process_asa_crash -- Found 4 crashes
2020-07-10T13:53:15.762+0000 + 0:00:00 -- BDB Event: operator-- humanoid_process_asa_crash -- Using 689468191.20200710-083939472_crash_7-7.txt
2020-07-10T13:53:15.762+0000 + 0:00:00 -- BDB Event: operator-- humanoid_process_asa_crash -- Using 689468191.20200710-083939472_crash_7-7.txt
2020-07-10T13:53:15.763+0000 + 0:00:00 -- BDB Event: operator-- humanoid_process_asa_crash -- Using 689468191.20200710-083939501_crash_7-10.txt
2020-07-10T13:53:15.763+0000 + 0:00:00 -- BDB Event: operator-- humanoid_process_asa_crash -- Found existing crash decode
2020-07-10T13:53:19.895+0000 + 0:00:04 -- BDB Event: operator-- humanoid_process_asa_crash -- matches ['CSCvi16029']
2020-07-10T13:53:24.000+0000 + 0:00:04 -- Humanoid: Added defect CSCvi16029
2020-07-10T13:53:28.836+0000 + 0:00:04 -- BDB Event: operator-- humanoid_process_asa_crash -- Found these emails on the SR: ['customer@customer.com']
2020-07-10T13:53:28.899+0000 + 0:00:00 -- BDB Event: operator-- humanoid_process_asa_crash -- Better customer name customer@customer.com -> Customer
2020-07-10T13:53:28.900+0000 + 0:00:00 -- BDB Event: operator-- humanoid_process_asa_crash -- Sending email to ['customer@customer.com']
2020-07-10T13:53:29.000+0000 + 0:00:00 -- humanoid:

810

Decoded and analyzed crash data and determined that the crash is related to bug CSCvi16029. Sent information about bug, and fixed builds to the customer 2020-07-10T13:53:31.000+0000 + 0:00:02 -- humanoid:

Touch base with customer and ensure there are no further questions regarding this bug.

| Campaign | ASA_FTD_Crash (905) | Filter: Actively Owned by Humanoid (910) | Showing 32 cases out of 324 in memory |

50m 30s ago | 698468191 | ASA 5512 is Restarting Most Nights | Customer Pending | Review / 950a
Brett Smith | The St Pete Pier | CSCvi16029 | Phone | *915* Humanoid
Notes Minimized
Crash request – Fri Jul 10 2020 09:28:59 GMT-04:00 | Sent Answer- Fri Jul 10 2020 09:53:36 GMT -04:00

6h 19m 1s ago | 689375834 | FPR2110 – NGFW – K9 Crashing | Customer Pending Workaround | Review / 950b
IT Team | Offshore Fishing Co. | CSCvp36425 | Email | *920* Humanoid
Notes Minimized
Crash request – Fri Jun 25 2020 11:14:29 GMT-04:00 | Sent Answer- Fri Jun 26 2020 13:44:24 GMT -04:00

12h 11m 1s ago | 689455082 – device is rebooting every day due to software crash | Customer Pending | Review / 950c
Jane Smith | FGS | CSCvi16029 | Email | Humanoid

*925*
*930*

Most Recent Humanoid Email: Mon Jul 13 2020 03:04:17
From: Humanoid@company.com
To: Jane.Smith@customer.com         *940a*
Hello Jane,
No problem. Just keep me posted.

A-2 Sherlock (ANSWER_EVENT – 4e56c – Prob: 0.7555): Mon Jul 13 2020 03:04:03
11m43s ago         *940b*
No problem. Just keep me posted.

Q-2 Customer Jane.Smith@customer.com – 4e56c: Mon Jul 13 2020 02:02:53 – happened 13h 12m 53s ago
we have upgraded the firewall to 9.12.3.12
i am going to observe the new code in operation for a few days
i will let you know by wednesday         *935a*

Most Recent Non-Humanoid Email in: Mon Jul 13 2020 01:54:52 – happened 13h20m54s ago
From: Jane.Smith@customer.com         *935b*
To: Humanoid@company.com
Hello Humanoid,
We have upgraded the firewall to 9.12.13.12. I am going to observe the new code in operation for a few days. I will let you know by Wednesday.
Regards,
Jane Smith
Network Operations LII
Cell: 777-555-2222

HUMANOID SYSTEM FOR AUTOMATED CUSTOMER SUPPORT

CROSS REFERENCE TO RELATED APPLICATION

This application is a continuation of U.S. application Ser. No. 17/079,747, entitled "Humanoid System for Automated Customer Support," filed Oct. 26, 2020, now U.S. Pat. No. 11,875,362, which claims the benefit of priority under 35 U.S.C. § 119 to U.S. Provisional Patent Application No. 63/051,558, titled "Technical Assistance Center (TAC) Humanoid for Automatic Servicing of Support Cases," filed Jul. 14, 2020, the entirety of both of which are incorporated herein by reference.

TECHNICAL FIELD

The present disclosure relates to providing automated customer support using a humanoid system.

BACKGROUND

Companies often provide customer support in connection with products and/or services. For example, computing and network equipment and services providers typically offer technical customer support to address customer issues related to the equipment and services, such as computer crashes or other malfunctions, network outages, etc. Customers expect their issues to be addressed timely and effectively.

However, staffing resource limitations often can cause customer issues to "queue up" with long wait times. Inexperienced support staff also may provide ineffective and/or inefficient service. These issues are compounded when unpredictable, large-scale events cause surges of customer support requests in excess of staffing capacity.

BRIEF DESCRIPTION OF THE DRAWINGS

FIGS. 5A-5C are diagrams depicting an operational flow for providing automated customer support using a humanoid system, according to yet another example embodiment.

FIG. 6 is a diagram depicting an inbound communication processing operation of a humanoid system, according to an example embodiment.

FIG. 7 is a diagram depicting an outbound communication processing operation of a humanoid system, according to an example embodiment.

FIG. 8 is a diagram depicting a support action execution operation of a humanoid system, according to an example embodiment.

FIG. 9 is an example screenshot of a user interface displayed in connection with a monitoring operation of a humanoid system, according to an example embodiment.

DESCRIPTION OF EXAMPLE EMBODIMENTS

Overview

Figure 1:
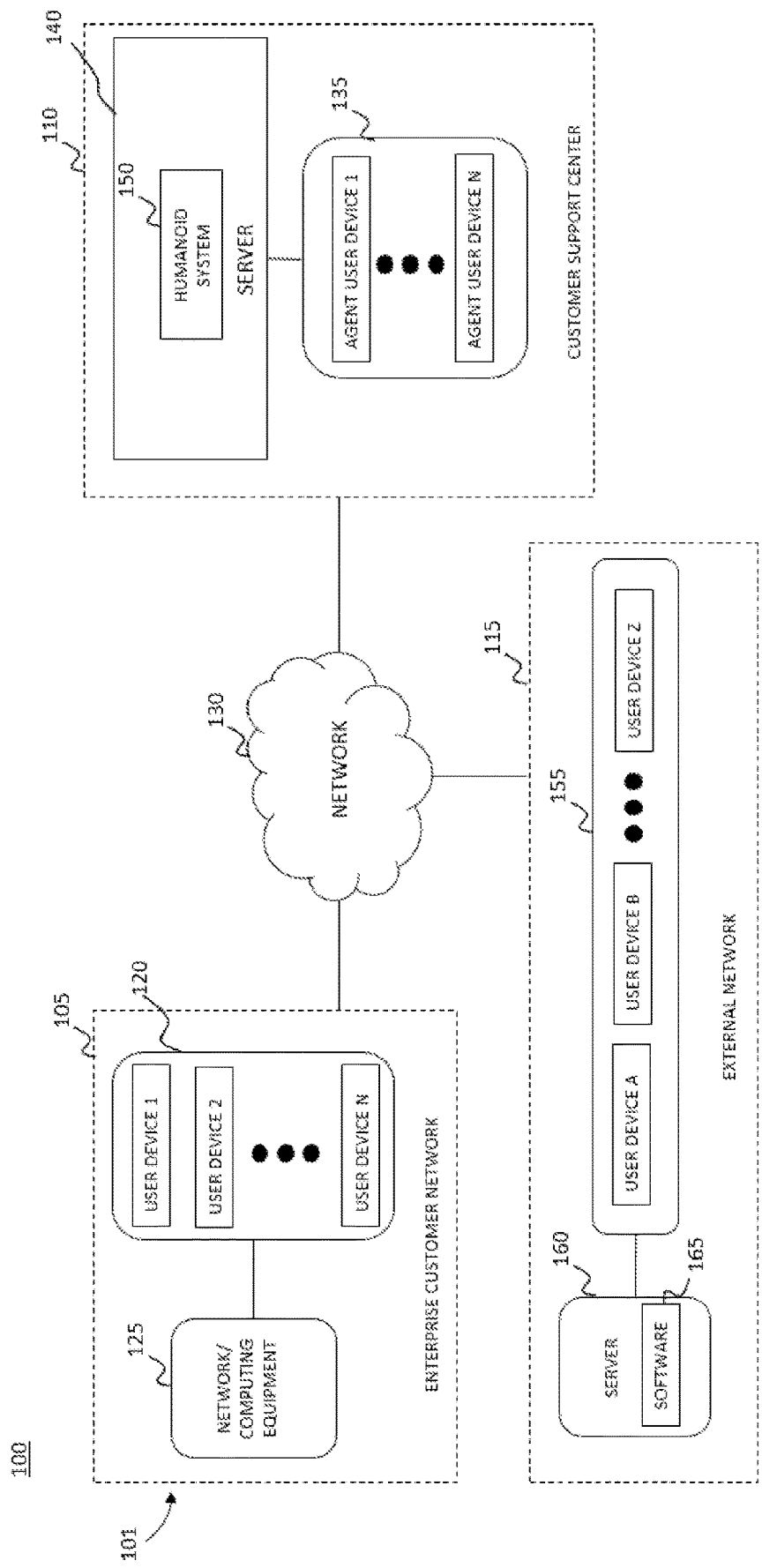
FIG. 1 is a diagram of a system for providing automated customer support, according to an example embodiment.

A computer executed process for mimicking human dialog, referred to herein as a "humanoid" or "humanoid system," can be configured to provide automated customer support. The humanoid can identify a support issue for a customer and identify a customer support campaign corresponding to the support issue. The humanoid can identify at least one machine learning model associated with the customer support campaign and can communicate with the customer using the at least one machine learning model. The humanoid can execute a support action to resolve the support issue.

Example Embodiments

Presented herein are systems and methods for providing automated customer support services using a humanoid. The humanoid is configured to use machine learning models and custom automation capabilities to address support issues on behalf of a customer support center. The support issues can include any technical, product, service, or other issue to be addressed for, or on behalf of, a customer.

The support issues can include, e.g., issues for which customers have requested information and/or assistance, as well as issues detected by the humanoid or another system independent of any customer requests. For example, the humanoid can receive a support request directly from a customer, intercept a support request directed to a human operator at the customer support center, take over a support case previously being handled by a human operator at the customer support center, or proactively initiate a support case in response to a support issue being detected by the humanoid or another system.

In an example embodiment, the humanoid is configured to handle support issues corresponding to multiple different types of customer support campaigns. Each customer support campaign is a different type of customer issue for which customer support may be provided. For example, there may be a customer support campaign for a network outage, a computer crash or other malfunction, a provision of software, hardware, a license, or a return merchandise authorization ("RMA"), and/or any other type of support matter. There may be at least one machine learning model or other automation capability associated with each customer support campaign. For example, each customer support campaign may have a different trained machine learning model for facilitating communications by the humanoid in connection with the customer support campaign.

The humanoid can be configured to execute one or more support actions, e.g., by cooperating with at least one system external to the humanoid and/or taking another action, to resolve the support requests. The humanoid can be configured to resolve the support issues like an actual human would, though potentially at a greater speed and with more accuracy than a human. In an example embodiment, the humanoid can be configured to resolve a support issue for a customer end-to-end without an actual human communicating with the customer. For example, the humanoid may provide automated support in a manner such that the customer receiving the support believes they are communicating directly with a human rather than a machine.

In an example embodiment, at least one human operator can monitor the humanoid to potentially intervene and/or dynamically train the humanoid (and/or machine learning models used by the humanoid). For example, the humanoid can echo its communications (and/or provide proposed communications) to a human operator who can provide the humanoid with feedback, such as proposed modifications to the communications and/or proposed information to include in supplemental communications. The humanoid can complete the communications using the feedback without the human operator communicating with the customer. The machine learning models can be updated as appropriate based on the actions/communications of the humanoid (and/or human operator) to dynamically improve performance by the humanoid.

Merely for ease of description, the techniques presented herein are primarily described with reference to a specific type of customer support, namely technical support for computing and networking equipment. However, it is to be appreciated that the techniques presented herein may be implemented for any type of customer support services, whether technical in nature or otherwise.

Referring initially to FIG. 1, an example system 100 for providing automated customer support can include an enterprise customer network 105 of a customer 101, a customer support center 110, and an external network 115. The customer 101 is a company or other entity/enterprise that receives support services from the customer support center 110. The enterprise customer network 105 includes multiple user devices 120, which are configured to operate within the enterprise customer network 105. Each user device 120 includes a computer or processing system, such as a desktop, laptop, tablet, phone, or other mobile or non-mobile device. Each user device 120 may include, for example, one or more types of displays (e.g., a screen or monitor) and input devices (e.g., a keyboard, mouse, voice recognition, etc.) to enter and/or view information.

The user devices 120 may be configured to communicate with one another and/or one or more other computing devices, e.g., via network/computing equipment 125. The network/computing equipment 125 can include one or more software and/or hardware modules or units, processing or computer systems, and/or circuitry that provides interfaces, connections (wired or wireless), or other pathways for electronic communication. For example, the network/computing equipment 125 can include one or more copper transmission cables, optical transmission fibers, wireless transmission devices, routers, firewalls, switches, gateway computers, and/or edge servers.

The user devices 120 may be configured to communicate with various systems and devices external to the enterprise customer network 105, such as systems and devices of the customer support center 110 and external network 115, via a network 130. The network 130 includes any communications medium for transmitting information between two or more computing devices. For example, the network 130 can include a local area network (LAN), wide area network (WAN), virtual private network (VPN), Intranet, Internet, hardwire connections, modem connections, wireless connections, or combinations of one or more these items.

The customer support center 110 includes multiple agent user devices 135, which are configured to operate within the customer support center 110. The agent user devices 135 can cooperate with a server 140 and/or other network/computing equipment (not shown) to provide technical or other support services to customers, including the customer 101. For example, the agent user devices 135 and server 140 can provide technical support to the customer 101 in connection with the network/computing equipment 125. Each agent user device 135 includes a computer or processing system, such as a desktop, laptop, tablet, phone, or other mobile or non-mobile device. Each agent user device 135 may include, for example, one or more types of displays (e.g., a screen or monitor) and input devices (e.g., a keyboard, mouse, voice recognition, etc.) to enter and/or view information.

The server 140 is a computing device that includes a humanoid system 150. The humanoid system 150 includes software, which when executed by a computer processor, such as a processor of the server 140, can mimic human dialog. For example, the humanoid system 150 can be configured to participate in conversations involving the humanoid system 150 and one or more user devices 120 and/or agent user devices 135 to provide customer support services to the customer 101. The humanoid system 150 is described in more detail below with reference to FIGS. 2 and 3.

The external network 115 includes multiple user devices 155, which are configured to operate within the external network 115. For example, the user devices 155 can cooperate with a server 160 and/or other network/computing equipment within or outside of the external network 115 to perform auxiliary services in connection with the customer support services of the customer support center 110. Each user device 155 includes a computer or processing system, such as a desktop, laptop, tablet, phone, or other mobile or non-mobile device. Each user device 155 may include, for example, one or more types of displays (e.g., a screen or monitor) and input devices (e.g., a keyboard, mouse, voice recognition, etc.) to enter and/or view information.

The server 160 is a computing device that includes software 165, which when executed by a computer processor, such as a processor of the server 160, can aid in the provision of the auxiliary support services. For example, the user devices 155 and software 165 can cooperate to solve problems or otherwise take action to address a customer support issue being handled by the customer support center 110.

Figure 2:
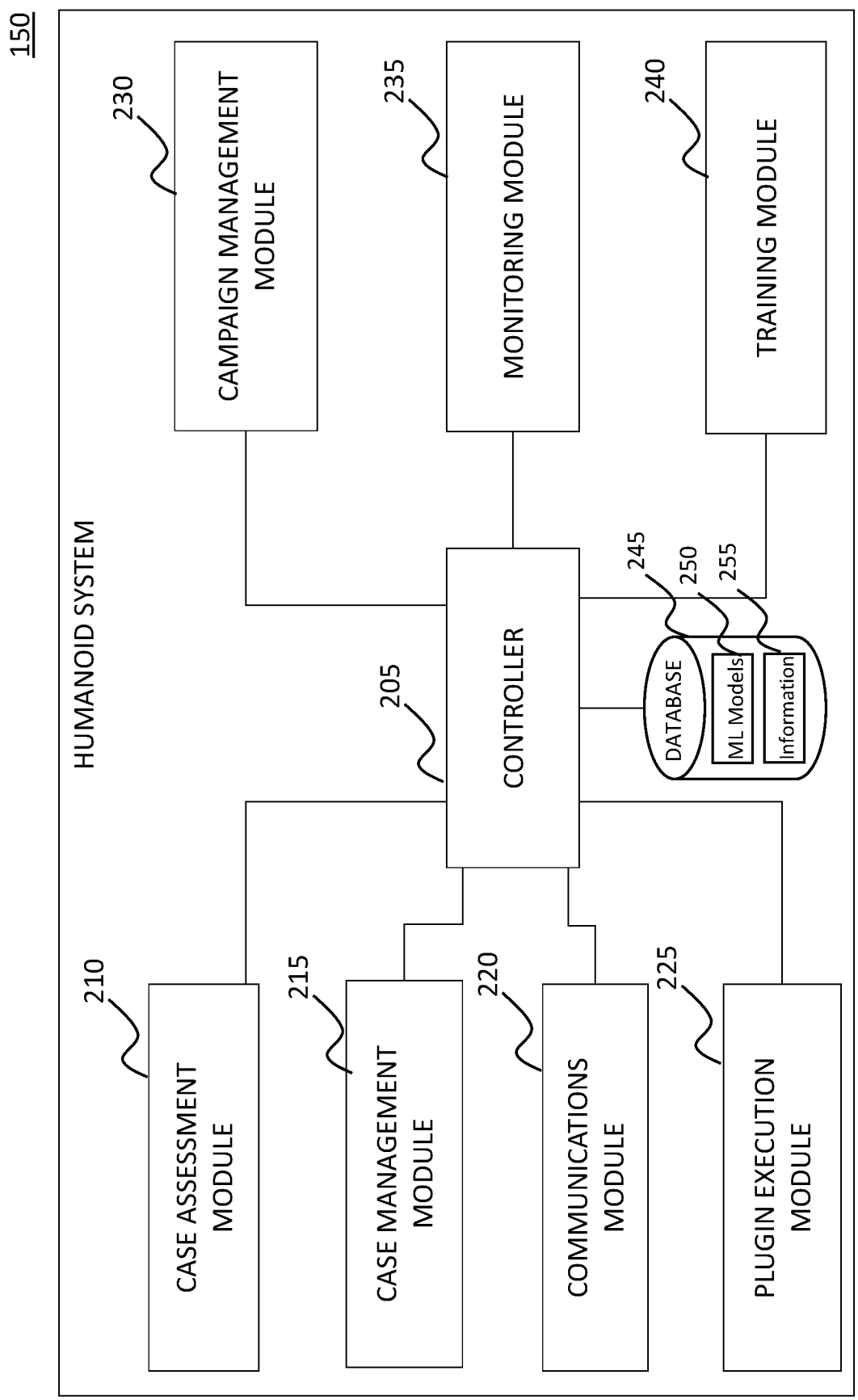
FIG. 2 is a block diagram of a humanoid system for providing automated customer support, according to an example embodiment.
Figure 3:
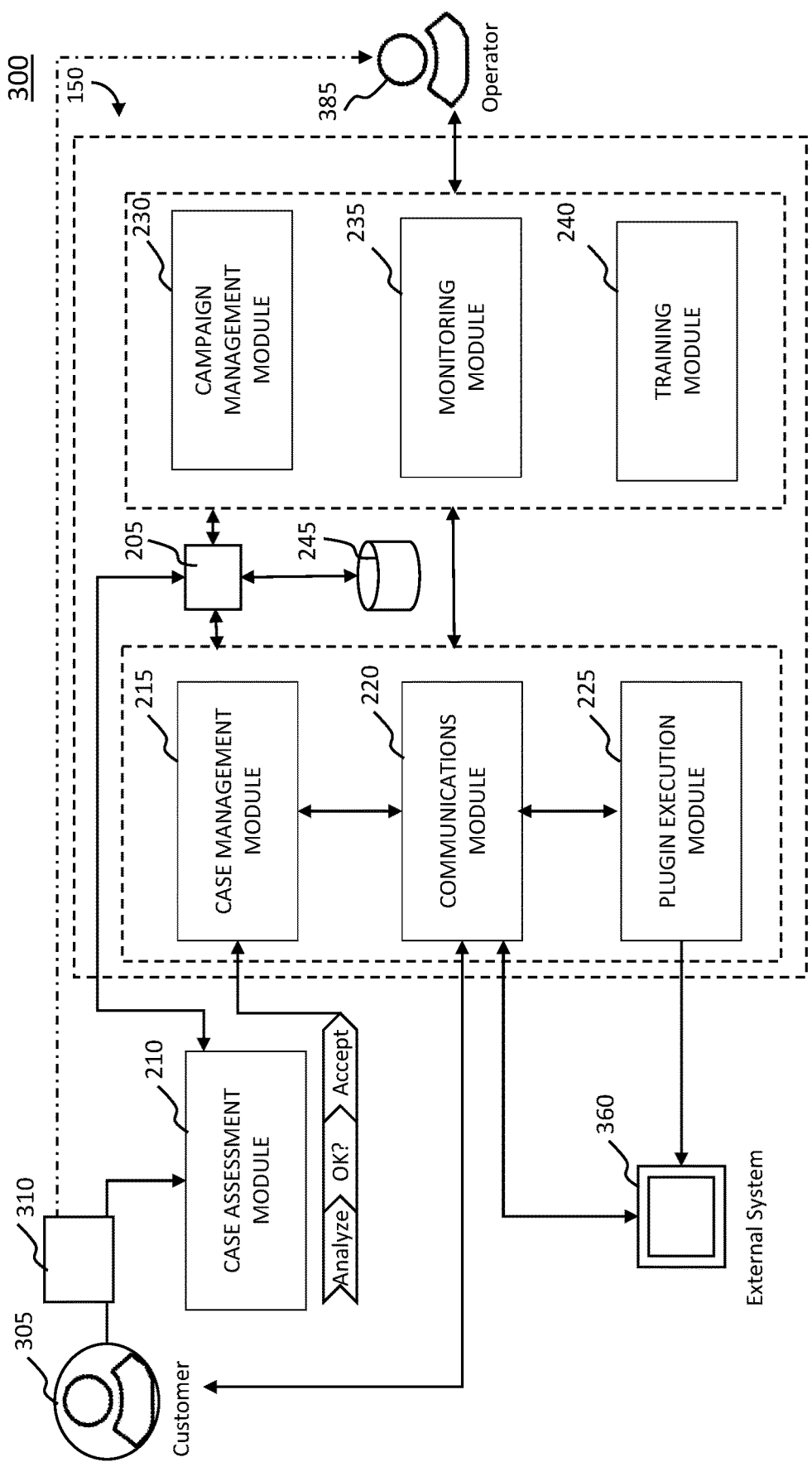
FIG. 3 is a diagram depicting an operational flow for providing automated customer support using a humanoid system, according to an example embodiment.

FIG. 2 is a block diagram of the humanoid system 150, according to an example embodiment. FIG. 3 is a diagram depicting an operational flow 300 for providing automated customer support using the humanoid system 150, according to an example embodiment. FIGS. 2 and 3 are described together for ease of description.

The humanoid system 150 includes a controller 205, which is operatively coupled to, and configured to send instructions to, and receive instructions from or for, various modules of the humanoid system 150, including: a case assessment module 210, a case management module 215, a communications module 220, a plugin execution module 225, a campaign management module 230, a monitoring module 235, and a training module 240. The controller 205 and modules generally cooperate to provide automated customer support.

The case assessment module 210 is configured to monitor incoming support requests and determine, for each support request, whether to have the support request handled by the humanoid system 150 or a human operator or another resource outside of the humanoid system 150. For example, the case assessment module 210 can be configured to receive support requests directly from customers and/or, as depicted in FIG. 3, to intercept support requests 310 that are directed from a customer 305 to a human operator 385. The case assessment module 210 also can be configured to proactively identify support issues, e.g., in response to detection of a problem or other matter potentially of interest to one or more customers by the humanoid system 150 or another system, without any support request being provided by or on behalf of a customer. For example, the case assessment module 210 can detect a system or network outage, malfunction, or other issue, and proactively create a support case in connection with which the humanoid system 150 can notify the customer(s) and facilitate remediation or other steps for resolution of the support case. For simplicity, the terms "support issue," "support case," and "case" are generally used interchangeably herein to refer to any support matter, and the activities associated therewith, whether the support matter is initiated via a support request, a detection of a support issue, or otherwise.

The case assessment module 210 determines, for each support issue, whether the humanoid system 150 is capable of handling the support issue. For example, the case assessment module 210 can read or otherwise identify information regarding the support issue (e.g., in a title or problem description field of any support request and/or any attached log files) and use that information (e.g., as an input to a machine learning model) to determine whether the support issue corresponds to an existing customer support campaign. If the support issue corresponds to an existing customer support campaign, the case assessment module 210 can determine whether the humanoid system 150 has been fully trained or otherwise configured to handle support issues for the existing customer support campaign. If the support issue does not correspond to an existing customer support campaign, or if the humanoid system 150 has not been fully trained or otherwise configured to handle support issues for a corresponding customer support campaign, the case assessment module 210 may determine that the humanoid system 150 is not capable of handling the support issue and may, therefore, cause the support issue to be handled by a human operator or another resource outside of the humanoid system 150.

The case assessment module 210 also may consider whether a confidence score for addressing the customer's particular support issue is above a predetermined threshold when determining whether, and to what degree, to have the humanoid system 150 handle the support issue. For example, if a machine learning model indicates that the humanoid system 150 can address the customer's support issue (e.g., by answering a question, fulfilling a request, or otherwise) with a confidence score above a predetermined threshold, the case assessment module 210 may determine to have the humanoid system 150 handle the support issue. If the confidence score is below the predetermined threshold, the case assessment module 210 may, e.g., determine to not have the humanoid system 150 handle the support issue, or may have a human operator supervise handling of the support issue by the humanoid system 150, or may cooperate with one or more other resources inside or outside of the humanoid system 150 to increase the confidence score so that the humanoid system 150 can handle the support issue. For example, if a support issue is raised for a connected device, the case assessment module 210 could cause the humanoid system 150 to reach out to that connected device proactively to obtain information for processing to increase the confidence score, e.g., by confirming that the support issue matches a particular, trained customer support campaign and not another, untrained customer support campaign.

In an example embodiment, the case assessment module 210 can determine whether the humanoid system 150 is capable of handling the support issue by referencing information stored in a database 245. The database 245 includes one or more machine learning models 250 and/or other information 255 and/or resources for handling support issues. Each of the machine learning models 250 may be trained and/or untrained, e.g., through supervised learning, unsupervised learning, semi-supervised learning, reinforcement learning, and/or self-learning, and may include or have associated therewith one or more algorithms, data, and/or other logic.

In an example embodiment, the machine learning models 250 and information 255 are specifically tailored to each of various different types of customer support campaigns. For example, for each customer support campaign, the database 245 can include one or more machine learning models 250 that have been trained to facilitate communications by the humanoid system 150 in connection with the customer support campaign. For example, the case assessment module 210 can determine to have the humanoid system 150 handle a particular support issue only if the database 245 includes one or more trained machine learning models for a customer support campaign corresponding to the support issue. This approach can, e.g., eliminate the possibility of the humanoid system 150 communicating information to a customer that is unrelated to the customer's case.

The database 245 can include any data stores or storage structures (e.g., files, databases, data structures, data or other repositories, etc.) that are configured to store information. Though depicted in FIGS. 2 and 3 as being located within the humanoid system 150 (and, therefore, the server 140 (FIG. 1)), it should be recognized that the database 245 could be located remote from the humanoid system 150 (and/or server 140), e.g., in a cloud or data center solution, in alternative example embodiments.

In an example embodiment, the case assessment module 210 can be further configured to reassign handling of support cases. For example, the case assessment module 210 can reassign a support case being handled by a human operator to the humanoid system 150 in response to a reassignment request from the human operator. The human operator may submit a reassignment request, e.g., upon determining that the humanoid system 150 is capable of handling all remaining work required to resolve a support case. For example, if a human operator determines that a customer's issue requires a software upgrade, which is not yet available, the human operator may "offload" the case to the humanoid system 150 to automatically monitor the status of the software release, keep the customer up-to-date, notify the customer once the software is available, verify the customer's download and installation of the software, and confirm that the customer's issue is resolved, thereby freeing the human operator to complete other tasks. Alternatively, the case assessment module 210 can be configured to monitor handling of the case by the human operator and proactively initiate case reassignment (without receiving a reassignment request from the human operator) upon a determination that the case is at a stage where the humanoid system 150 is capable of completing all remaining work required to resolve the case. For example, the humanoid system 150 can complete an automatic follow-up of a human operator's backlog of cases to remove remedial work from the human operator.

In an example embodiment, the case assessment module 210 can be configured to consider additional factors, such as one or more characteristics of the customer, when determining whether to assign (or reassign) a case to the humanoid system 150. For example, business rules may be established so that only certain customers or certain types of customers are handled by the humanoid system 150. For example, the business rules could provide for personal support from a human operator to be delivered to customers subscribing to a particular level of support services, regardless of any capabilities or other settings of the humanoid system 150.

The case management module 215 is configured to manage the handling of support cases assigned to the humanoid system 150. For example, in cooperation with the controller 205, the case management module 215 can accept a case assignment from the case assessment module 210 and coordinate with the controller 205, communications module 220, and plugin execution module 225 to communicate and take actions as appropriate to resolve the support case. The case management module 215 can be configured to manage this process in a manner consistent with how a human operator would manage the process. For example, upon acceptance of a new case, the case management module 215 can read or otherwise identify information regarding the case (e.g., in a title or problem description field of any support request for the case) and make an initial determination whether enough information has been provided for the humanoid system 150 to take action to resolve the case. For example, the case management module 215 can, in cooperation with the controller 205, coordinate with the communications module 220, plugin execution module 225, and/or a system external to the humanoid system 150 (such as external system 360) to cause data provided by or for the customer to be processed (e.g., decoding a router crashinfo file), cause a license to be deposited into an online account for the customer, facilitate provision of an item to the customer, etc. As would be appreciated by a person of ordinary skill in the art, the types and complexities of actions can vary widely.

In an example embodiment, the case management module 215 can use the machine learning models 250 and/or information 255 in the database 245 to determine and execute an operation flow for the case. For example, if the case management module 215 determines upon acceptance of a case that there is not yet enough information for the humanoid system 150 to take action to resolve the case, the case management module 215 can, in cooperation with the controller 205, coordinate with the communications module 220 to obtain additional information.

The communications module 220 is configured to receive communications, process received communications, prepare communications, and send communications in a manner consistent with a human. Each communication can include an email, instant message, text message, webpage post (e.g., in a discussion forum), chat, voice communication (e.g., involving speech, speech-to-text transcription, and/or text-to-speech transcription), or another type of communication exchanged via an electronic medium. For example, the communications module 220 can read a support request and/or another communication from or for a customer and process the communication to derive a context and/or intent for the support issue, thereby enabling the communications module 220 to interact and respond effectively. The communications module 220 can be configured to cleanse and normalize inbound communications, e.g., using one or more natural language processing models or other logic, to eliminate noise and enable analysis of content therein.

In an example embodiment, the communications module 220 can use one or more machine learning models 250 and/or information 255 in the database 245 to mimic human dialog. For example, the communications module 220 can communicate with the customer and/or one or more external systems (such as external system 360) "as" the humanoid, i.e., with a persona akin to how an actual person would communicate with the customer and/or external systems. Thus, the customer and/or external system(s) can interact with the humanoid system 150 in a manner consistent with, and potentially even with the belief that, they are communicating directly with a human rather than a machine.

The plugin execution module 225 is configured to execute actions and/or coordinate with one or more other systems (outside of the humanoid system 150), such as the external system 360, to resolve support issues. For example, the plugin execution module 225 can use an application program interface (API or "plugin") to process, or cause another module/system to process, data provided by or for the customer, such as decoding a crash file to identify a specific bug causing a problem, recommending software versions, or completing another analysis. The analysis can be, e.g., more complex than an analysis that could ordinarily be completed by a human operator. For example, the analysis can involve complex calculations or tasks beyond simple question and answer capability. The plugin execution module 225 also can (e.g., through one or more plugins and/or through cooperation with the communications module 220) coordinate provision of hardware or software items (e.g., in connection with a purchase order fulfillment, license depositing (or re-hosting), RMA, or other process), etc. The plugin execution module 225 can cooperate with the communications module 220 to cause status, instructions, and/or other information to be shared with the customer.

The campaign management module 230 is configured to oversee operations in connection with each customer support campaign. For example, the campaign management module 230 can create new customer support campaigns and coordinate assignment of, and updates to, machine learning models and/or other information for supporting customer support campaigns. The campaign management module 230 may operate autonomously or via input from one or more human operators, such as human operator 385. For example, one or more human operators can interact with the campaign management module 230 via a user interface provided by the campaign management module 230 to create new customer support campaigns, assign new or different machine learning models or other resources to customer support campaigns, etc.

The monitoring module 235 is configured to enable one or more human operators to supervise activities of the humanoid system 150. For example, the monitoring module 235 can provide a user interface through which a human operator can observe all actions and proposed actions by the humanoid system 150, including viewing communications between the communications module 220 and the customer, and interject as appropriate. The user interface may be the same or different than any user interface provided by the campaign management module 230.

The user interface can, e.g., provide the human operator a view into what the humanoid system 150 is "thinking" and allow the human operator to make adjustments as appropriate. For example, the monitoring module 235 can cause the communications module 220 to echo its communications to the human operator and/or provide proposed communications to the human operator who can provide feedback, such as proposed modifications to the communications and/or proposed information to include in supplemental communications. The humanoid system 150 can complete all actions and participate in all communications with the customer using the feedback from the human operator but without the human operator communicating with the customer.

In an example embodiment, the monitoring module 235 can allow the human operator to choose whether or not to monitor particular actions and/or communications of the humanoid system 150. For example, a human operator may elect to aggressively monitor and interject for support issues that are associated with relatively new customer support campaigns and to forego supervising the humanoid system 150 for support issues corresponding to well established customer support campaigns with one or more fully trained (and confidently correct) machine learning models.

In an example embodiment, the monitoring module 235 can be configured to consider one or more business rules or other factors when determining whether to provide supervision for a particular action or communication by the humanoid system 150. For example, the business rules could provide for oversight only in connection with customers subscribing to a particular level of support services.

The training module 240 is configured to train the machine learning models 250 through one or more techniques, such as a supervised learning, unsupervised learning, semi-supervised learning, reinforcement learning, and/or self-learning technique. For example, the training module 240 can be configured to provide a user interface through which a human operator can review and confirm or correct actions, communications, and proposed actions and communications of the humanoid system 150 to refine the machine learning models 250. As would be appreciated by a person or ordinary skill in the art, it could take a few to many instances of seeing a same type of support issue or communication for the humanoid system 150 to be fully trained to handle that type of support issue or communication. For example, training may occur more frequently for matters seen only one to fifteen times as compared to matters seen twenty-five or more times.

In an example embodiment, the training module 240 can be configured to display training data and provide the user interface through which the human operator can submit questions against the data, thereby testing one or more machine learning models 250 to see what responses they would give to the questions. The user interface may be the same or different than any user interface provided by the monitoring module 235 or the campaign management module 230. The human operator can provide input through the user interface, such as an indication regarding whether a provided response is correct or incorrect or a modification to an answer, to refine the machine learning models 250.

Though indicated in FIGS. 2 and 3 as discrete logical components, it should be appreciated that the case assessment module 210, case management module 215, communications module 220, plugin execution module 225, campaign management module 230, monitoring module 235, training module 240, controller 205 and database 245 may be reconfigured as or in any number of different components without departing from the spirit and scope of the present disclosure. For example, certain functions and features of the case management module 215, communications module 220, plugin execution module 225, controller 205, and database 245 could be integrated in one or more humanoid execution modules, while certain functions and features of the campaign management module 230, monitoring module 235, training module 240, controller 205, and database 245 could be integrated in one or more humanoid management modules, in alternative example embodiments.

Figure 4:
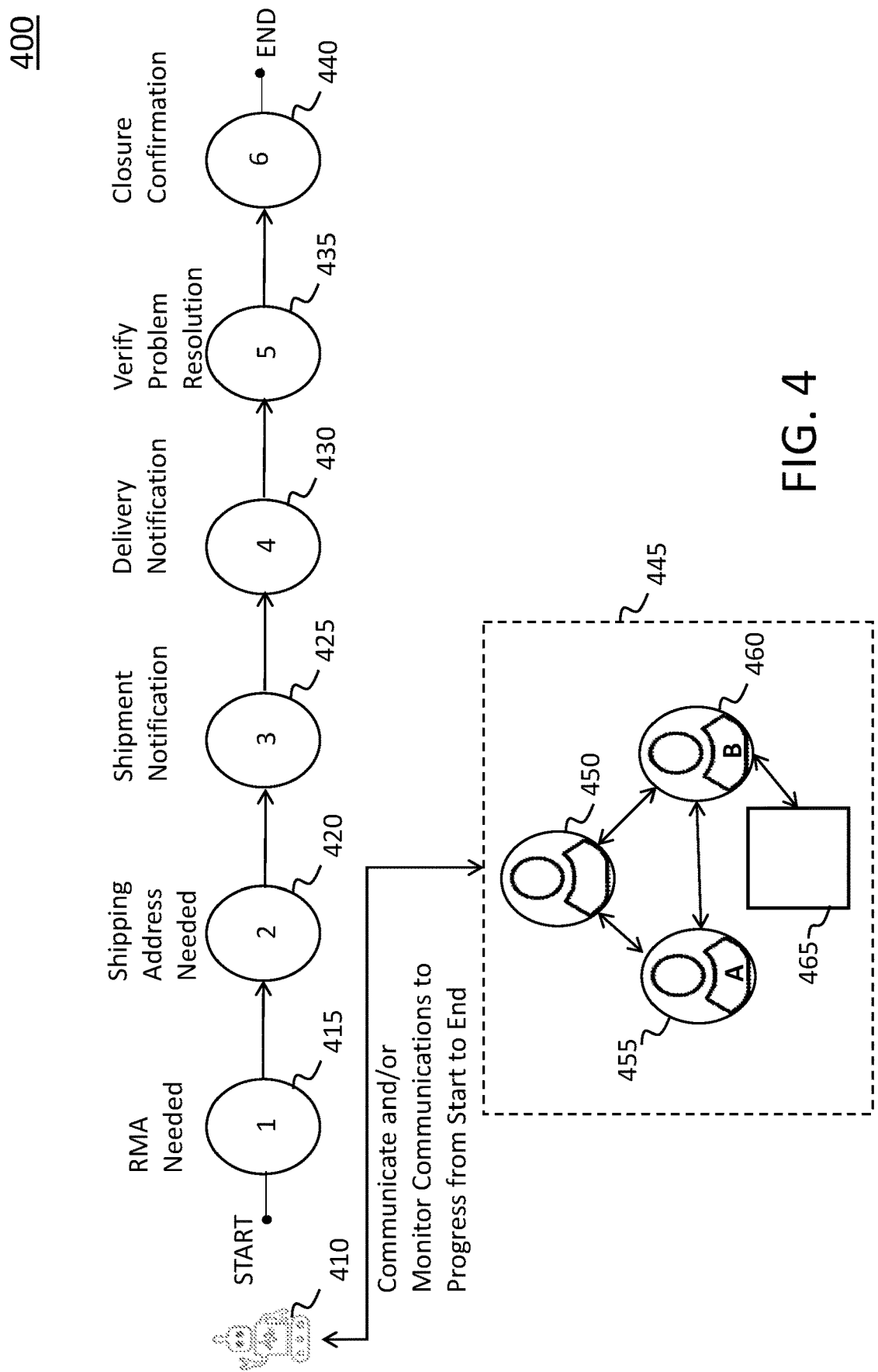
FIG. 4 is a diagram depicting an operational flow for providing automated customer support using a humanoid system, according to another example embodiment.

Turning now to FIG. 4, an example operational flow 400 is shown for providing automated customer support using a humanoid system, according to an example embodiment. The operational flow 400 involves an RMA customer support process by which items can be returned for repair, maintenance, refund, or replacement. As would be recognized by a person of ordinary skill in the art, this type of customer support process is illustrative and should not be construed as being limiting in any way. In particular, the techniques disclosed herein can be used in connection with RMA and non-RMA types of customer support issues without departing from the spirit or scope of this disclosure.

The operational flow 400 is implemented via a humanoid 410, which is configured to provide the customer support by, among other things, communicating with one or more other endpoints 445. For example, the endpoints 445 can include a customer 450, a first person ("PersonA") 455, a second person ("PersonB") 460, and an external system 465. The customer 450, PersonA 455, and PersonB 460 can participate in the communications, e.g., via one or more computing devices.

The humanoid 410 can communicate, directly or indirectly, with one or more of the endpoints 445, and/or observe communications among one or more of the endpoints 445, to collect information for proceeding through the operational flow 400. For example, after determining in a first step 415 that RMA is needed, the humanoid 410 can determine in a second step 420 that it needs a shipping address. The humanoid 410 can ask one or more of the endpoints 445 for the shipping address information and/or monitor communications involving the endpoints 445 to accept (and, optionally, acknowledge) receipt of that information.

In an example embodiment, the humanoid 410 can obtain the information from the communications, regardless of whether the humanoid 410 was the directed recipient of the information. For example, in response to the request from the humanoid 410 or unrelated to the request from the humanoid 410, the customer 450 may send a communication to PersonA 455 (e.g., with a copy to, or otherwise including, the humanoid 410) with the required shipping information. The humanoid 410 may accept and acknowledge the shipping information even though the communication was not directed to the humanoid 410 (e.g., if the humanoid 410 is not identified in the "to:" field of the communication) and even if the communication does not specifically call out the humanoid 410 in a salutation or body of the communication. Upon accepting the shipping information, the humanoid 410 may proceed to prepare a shipment notification in step 425, prepare a delivery notification in step 430, verify problem resolution 435, and confirm closure of the customer support case in step 440. The humanoid 410 may complete these steps directly or in cooperation with one or more external systems, e.g., via one or more of the endpoints 445.

Figure 5B:
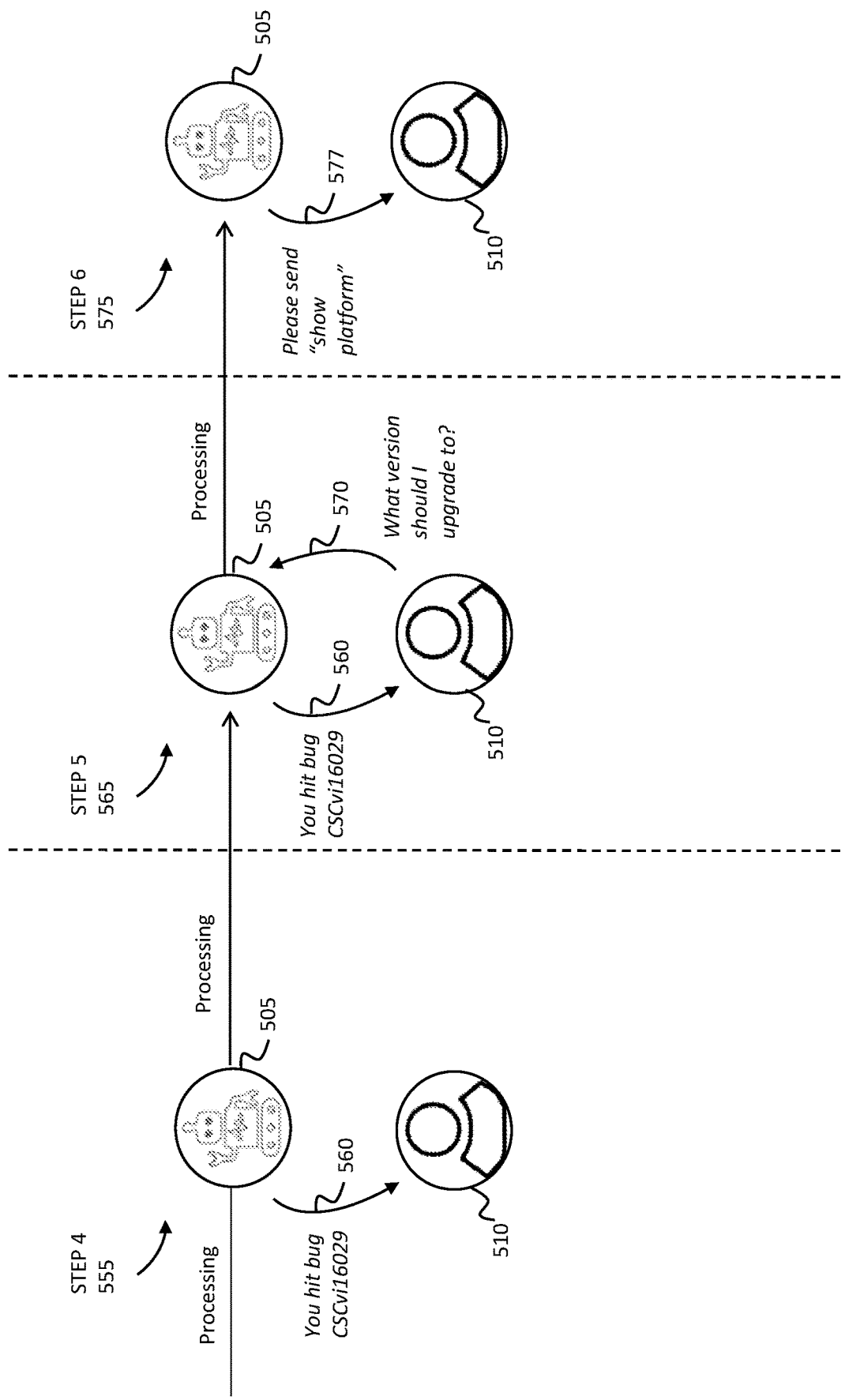
Figure 5C:
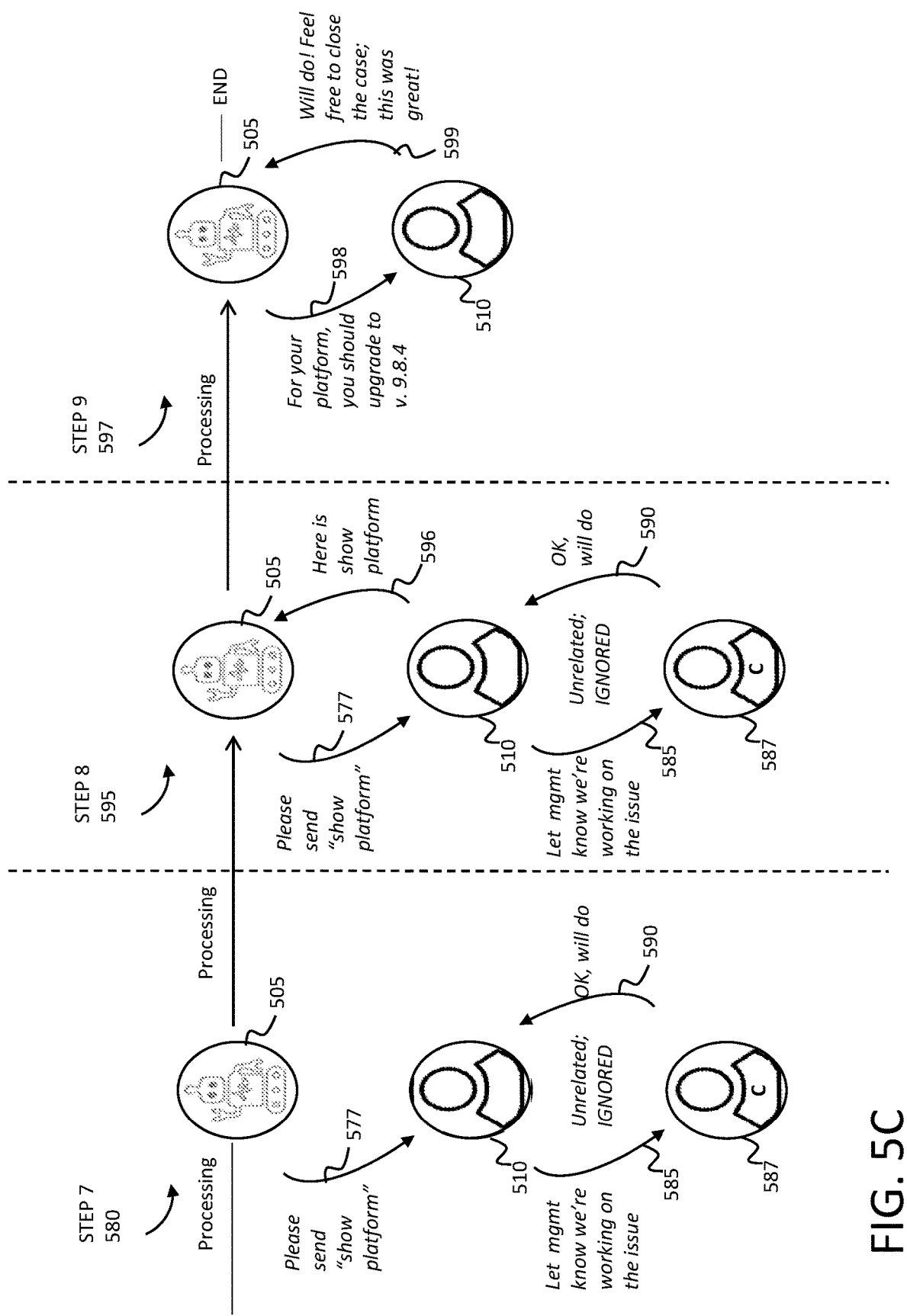

Reference is now made to FIGS. 5A-5C, which illustrate an operational flow 500 for providing automated customer support using a humanoid 505, according to another example embodiment. The flow 500 includes a series of electronic communications involving the humanoid 505. Each electronic communication takes the form of an email, instant message, text message, webpage post (e.g., in a discussion forum), chat, voice communication (e.g., involving speech, speech-to-text transcription, and/or text-to-speech transcription), or another type of communication exchanged via an electronic medium.

In the flow 500, the humanoid 505 is providing customer support to a customer 510. In particular, the customer 510 has experienced a computer malfunction (or "crash"), and the humanoid 505 is communicating with the customer 510 to try and resolve the crash. The communications are represented visually in FIGS. 5A-5C as a nodal graph, where each edge represents a communication stream and each node represents an endpoint.

In a first step 515 of the flow 500, the humanoid 505 sends the customer 510 an electronic communication 520, asking the customer 510 to provide information regarding the customer support needed by the customer 510. In particular, the electronic communication 520 requests that the customer 510 provide information regarding the crash, saying, "Please send 'show crash.'" In a second step 525, the customer sends a communication 535 to another person ("PersonB") 530 to obtain the requested information. For example, the communication 535 could include a message saying, "Can you send the data?", directed to PersonB 530 with a copy to (or otherwise including) the humanoid 505.

In a third step 540, PersonB 530 responds to the request by sending the customer 510 and humanoid 505 the requested data 545 in a communication 550. In a fourth step 555 (FIG. 5B), the humanoid 505 processes the data received in the communication 550 and sends the customer 510 a communication 560 with its analysis of the data. More specifically, the humanoid 505 tells the customer 510 in the communication 560 that they have encountered a known computer bug called "CSVi16029".

Next, in a fifth step 565, the customer 510 confirms receipt of the communication 560 and asks, in a communication 570, a new question regarding a version of software to which they should upgrade. The humanoid 505 processes this new question and, in a sixth step 575 sends the customer 510 a communication 577 with a request for additional information regarding the customer's user platform. In a seventh step 580 (FIG. 5C), the customer 510 sends a communication 585 to a new person ("PersonC") 587, saying, "Let management know we're working on the issue," and PersonC 587 responds to the communication 585 with a communication 590, saying, "OK, will do." The humanoid 505 can read the communications 585 and 590 and determine to ignore and not respond to them, whether by taking action, sending a communication, or otherwise. For example, the humanoid 505 can determine not to respond to the communications 585 and 590 because the communications 585 and 590 are not directed to the humanoid 505, do not pose any questions the humanoid 505 can answer, and do not include any information requested by the humanoid 505 or otherwise resolving any open issues being addressed by the humanoid 505.

In an eighth step 595, the customer 510 responds to the humanoid 505 with the requested platform information in communication 596. In a ninth step 597, the humanoid 505 processes the platform information from the communication 596 and sends the customer 510 an answer to the open inquiry (from communication 570) regarding the software version to upgrade to, in a communication 598, saying, "For your platform, you should upgrade to v. 9.8.4." The customer 510 can send a communication 599 to acknowledge closure of the issue, e.g., by saying, "Will do! Feel free to close the case; this was great!" Upon receipt of a confirmation of closure or if no additional communications requiring action by the humanoid 505 are received within a predetermined period of time, the humanoid 505 can close the case and terminate the conversation.

Noteworthy about the communications depicted in the example of FIGS. 5A-5C is that the humanoid 505 very closely mimics the behavior of a human such that the humans involved in the communications do not realize they are dealing with a machine-based process that is simulating a human.

Turning now to FIG. 6, an example inbound communication processing operation 600 of a humanoid system is shown, according to an example embodiment. In the operation 600, the humanoid system has received a message 605 from a customer. The message 605 includes formatting and/or content—such as one or more capitalized letters, periods, or other formatting features, a header 610 with "from", "to", "cc:", and "subject" fields, and a signature 615—which does not include substantive content useful for resolving a support issue and/or is not be able to be processed by a natural language processor or other communication interpretation logic of the humanoid system. In the operation 600, the humanoid system normalizes and cleanses the message 605, creating a modified message 620, which can be interpreted and used by the humanoid system to provide support to the customer. As would be recognized by a person of ordinary skill in the art, this type of normalizing and cleaning process is illustrative and should not be construed as being limiting in any way.

FIG. 7 is a diagram depicting an outbound communication processing operation of a humanoid system, according to an example embodiment. In the operation 700, the humanoid system has sent a message 705 to a customer named "Customer" in order to advise the customer that the humanoid system is handling a support issue for the customer. The message 705 is addressed from the humanoid system, with dialogue and content akin to a communication from an actual human.

The message 705 is addressed from a name and address corresponding to the humanoid system—namely, "Humanoid"—though any name and address could be used. For example, the humanoid system could operate under one or more "real"-sounding names like "Sherlock Holmes," in order for the customer to feel (or even believe) that they are communicating directly with a human rather than a machine. The humanoid system may store content from, or related to, the message 705 in a data store (such as a case note file) for reference, oversight, and/or training purposes. As would be recognized by a person of ordinary skill in the art, the message 705 and the formatting, structure, and approach therein, are illustrative and should not be construed as being limiting in any way.

FIG. 8 is a diagram depicting a support action execution operation 800 of a humanoid system, according to an example embodiment. In the operation 800, the humanoid system has activated a plugin—the "humanoid_processasa_crash" plugin—to process a customer's crash files and identify a bug that caused the crash. The humanoid can store logs 805 summarizing and/or cataloging each step taken in the processing. According to the logs 805, the plugin has completed its analysis and returned a result 810 indicating that the "crash is related to bug CSCvi16029." In an example embodiment, each plugin accessible to the humanoid system can be (but doesn't necessarily have to be) configured to complete analyses and operations that are more complex than analyses and operations that could ordinarily be completed by a human. As would be recognized by a person of ordinary skill in the art, the logs 805 and the formatting, structure, and approach therein, are illustrative and should not be construed as being limiting in any way.

FIG. 9 is an example screenshot of a user interface 900 displayed in connection with a monitoring operation of a humanoid system, according to an example embodiment. For example, the user interface 900 could be displayed to a human operator interacting with a monitoring module of the humanoid system. The user interface 900 presents information regarding particular customer support campaigns and support issues for purposes of allowing the human operator to supervise and manage operation of the humanoid system.

The human operator can select a customer support campaign about which to view information by entering text or activating a check box, drop-down, or other input in a field 905. The human operator also can select one or more criteria to filter support issues within the selected customer campaign by entering text or activating a check box, drop-down, or other input in a field 910. For example, the human operator can enter an input in the field 910 to view only open support issues owned by the humanoid, open support issues owned by the human operator, closed support issues that were handled by the humanoid, closed support issues that were handled by the human operator, etc. In the example user interface 900, the human operator has elected to view information regarding support issues in an "ASA-_FTD_Crash" customer support campaign, which are actively being handled (or "owned") by the humanoid system.

The user interface 900 presents information regarding customer support issues meeting the selected criteria. For example, the example user interface 900 in FIG. 9 includes information regarding a first support issue 915 involving a customer "Brett Smith" who is dealing with a support issue related to "ASA 5512 is Restarting Most Nights," a second support issue 920 involving a customer "IT Team" who is dealing with a support issue related to "FPR2110-NGFW-K9 Crashing," and a third support issue 925 involving a customer "Jane Smith" who is dealing with a support issue related to "689455082-device is rebooting every day due to software crash." The human operator has elected to minimize notes for the first support issue 915 and the second support issue 920 but to view full notes for the third support issue 925. In particular, the human operator has elected to view a most recent question and answer exchange 930 between the customer and the humanoid system, including a normalized, cleansed version 935*a* of a question in the exchange 930, an unedited version 935*b* of the question in the exchange 930, an unedited version 940*a* of an answer in the exchange 930, and a normalized, cleansed version 940*b* of the answer in the exchange 930.

The human operator can review and/or provide feedback for a particular support issue by activating a "Review" button (950*a*, 950*b*, or 950*c*) corresponding to the support issue. For example, the human operator can activate review button 950*a* to review and/or provide feedback for the first support issue 915, review button 950*b* to review and/or provide feedback for the second support issue 920, or review button 950*c* to review and/or provide feedback for the third support issue 925. A review can include, e.g., viewing and/or providing input regarding activities, communications, and/or logs related to the support issue and any actions completed in connection therewith. Feedback can include, e.g., proposing modifications to one or more communications, proposing information to include in one or more supplemental communications, and/or proposing one or more suggested actions for the humanoid to execute or cause to be executed. The feedback can be used by the humanoid system to address the support issues and/or to train the humanoid system and/or one or more machine learning models used by the humanoid system.

As would be recognized by a person of ordinary skill in the art, the user interface 900 and the formatting, structure, and approach therein, are illustrative and should not be construed as being limiting in any way.

Figure 10:
FIG. 10 is an example screenshot of a user interface displayed in connection with a monitoring operation of a humanoid system, according to another example embodiment.

FIG. 10 is an example screenshot of a user interface 1000 displayed in connection with a monitoring operation of a humanoid system, according to another example embodiment. For example, the user interface 900 could be displayed to a human operator interacting with a monitoring module of the humanoid system. The user interface 1000 presents a communication for review by the human operator. The communication may include a communication that already has been sent by the humanoid system or a communication that the humanoid system proposes to send in the future. For example, the humanoid system may echo communications and/or provide proposed communications to the human operator who can review the communications and provide feedback through the user interface 1000.

In the example user interface 1000, the humanoid system has received a communication 1005 from a customer regarding a support case numbered "689419975", where the customer has said, "i've been able to install asa version 9.8(4) 25; i'll monitor but i believe that will not cause the random reloads i've been seeing; you may close the case." In the example user interface 100, the customer's message is presented in a normalized, cleansed form. The message may be presented in a different form, e.g., an original, unedited form, in alternative example embodiments.

The humanoid system is proposing to respond with a communication 1010 in which the humanoid closes the case. The humanoid system presents in the user interface 1000 information 1015, which substantiates the proposed communication 1010, such as a matched question from the machine learning model that correlates to the communication 1010 and/or the communication 1005, as well as a probability from the machine learning model that the proposed communication 1010 will appropriately respond to the customer's communication 1005. The human operator may review this information and determine, based on the information, whether to interject, e.g., by proposing one or more modifications to the proposed communication 1010, by providing information to include in one or more supplemental communications, and/or by proposing one or more suggested actions for the humanoid system to execute or cause to be executed. For example, the human operator can activate one or more inputs, such as input 1020, to interject and/or provide feedback. The humanoid system can complete all actions and participate in all communications with the customer using the feedback from the human operator without the human operator communicating with the customer.

The humanoid system can use the feedback/instructions from the human operator both to address the immediate support issue and to train the humanoid system and/or one or more machine learning models used by the humanoid system. For example, if the human operator confirms the proposed communication 1010 by the humanoid system, the humanoid system can validate the proposed communication 1010 for future use in connection with a corresponding machine learning model. Similarly, if the human operator rejects/modifies/supplements the proposed communication 1010, the humanoid system can learn from that action and use that action to train itself and/or one or more machine learning models used by the humanoid system.

As would be recognized by a person of ordinary skill in the art, the user interface 1000 and the formatting, structure, and approach therein, are illustrative and should not be construed as being limiting in any way.

Figure 11:
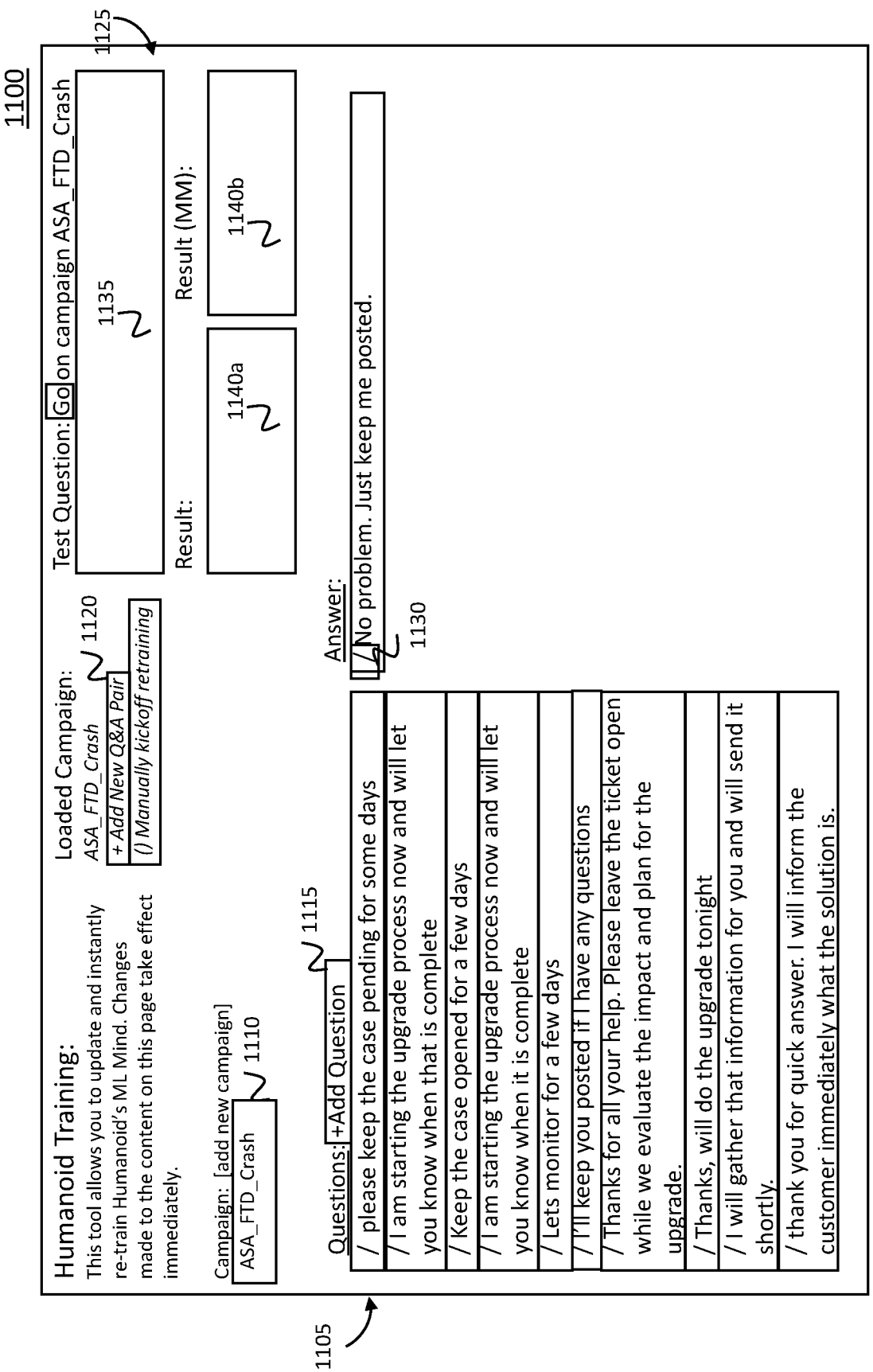
FIG. 11 is an example screenshot of a user interface displayed in connection with a training operation of a humanoid system, according to an example embodiment.

FIG. 11 is an example screenshot of a user interface 1100 displayed in connection with a training operation of a humanoid system, according to an example embodiment. For example, the user interface 1100 could be displayed to a human operator interacting with a training module of the humanoid system. The user interface 1100 is generally configured to enable a human operator to dynamically train the humanoid and/or one or more machine learning models used by the humanoid.

The user interface 1100 presents, for a selected customer support campaign, one or more questions and answers 1105 associated with the customer support campaign. For example, a human operator viewing the user interface 1100 can select a customer support campaign about which to view information by entering text or activating a check box, drop-down, or other input in a field 1110. In the example depicted in FIG. 11, the human operator has selected an "ASA_FTD_Crash" customer support campaign in field 1110.

The human operator can train the humanoid and/or machine learning models by adding one or more new questions through an input 1115 (e.g., by associating each new question with an existing, known answer, or a new answer), adding one or more new question and answer pairs through an input 1120, and/or testing one or more new questions through an interface 1125. The term "question" is used herein to refer to any input, whether worded in a question format, sentence format, or otherwise. For example, the phrase "Keep the case opened for a few days" can be treated as a question for purposes of the training/modeling process, even though it is a statement. While that particular statement elicited a response, namely, "No problem. Just keep me posted," it is to be understood that a question may or may not elicit a response. For example, the humanoid and/or human operator could determine that no reply or other action is required in response to a question.

As illustrated in FIG. 11, multiple questions can be associated with a same answer. For example, in addition to the phrase "Keep the case opened for a few days," several other questions, including "Thanks, will do the upgrade tonight," also can elicit the answer of "No problem. Just keep me posted." The human operator can associate additional or different questions with each answer through the input 1115. The human operator also can edit each particular question or answer by activating an edit icon, such as icon 1130, associated with the particular question or answer.

In an example embodiment, the human operator can simultaneously test multiple different machine learning models using the interface 1125. For example, the human operator can enter a question in a field 1135 and view different results and confidence scores for each machine learning model via fields 1140a and 1140b. The human operator can refine the machine learning models based on this testing, e.g., by confirming a best answer provided by the machine learning models and rejecting any other provided answers. In an example embodiment, the interface 1125 can display top answers (e.g., a top three or other number of answers) from each machine learning model, along with respective confidence scores for each of the answers. This could allow the human operator to both (a) compare a relative performance of each machine learning model, and (b) adjust a given machine learning model as appropriate. For example, the human operator may use the interface 1125 to change relative confidence scores for the provided answers, e.g., by promoting a provided answer with a lower probability to one with a higher probability (or vice versa).

Figure 12:
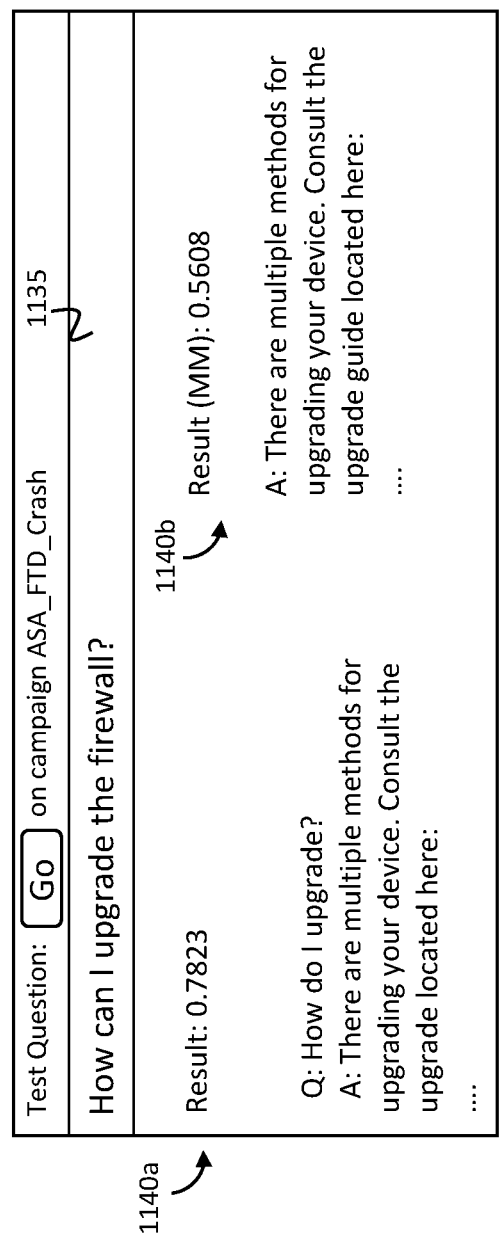
FIG. 12 is an example screenshot of a user interface displayed in connection with a training operation of a humanoid system, according to another example embodiment.

FIG. 12 is an example screenshot of the interface 1125, according to an example embodiment. In the example depicted in FIG. 12, the human operator has entered (in field 1135) a question of "How can I upgrade the firewall?" and two different machine learning models have provided proposed answers in fields 1140a and 1140b, respectively. In field 1140a, a first machine learning model has provided an answer with a confidence score of 0.7823, while, in field 1140b, a second machine learning module has provided an answer with a confidence score of 0.5608. The human operator can review the answers and confidence scores to select a best answer and/or to compare relative performance of the machine learning models.

As would be recognized by a person of ordinary skill in the art, the user interface 1100, including the interface 1125, and the formatting, structures, and approaches therein, are illustrative and should not be construed as being limiting in any way.

Figure 13:
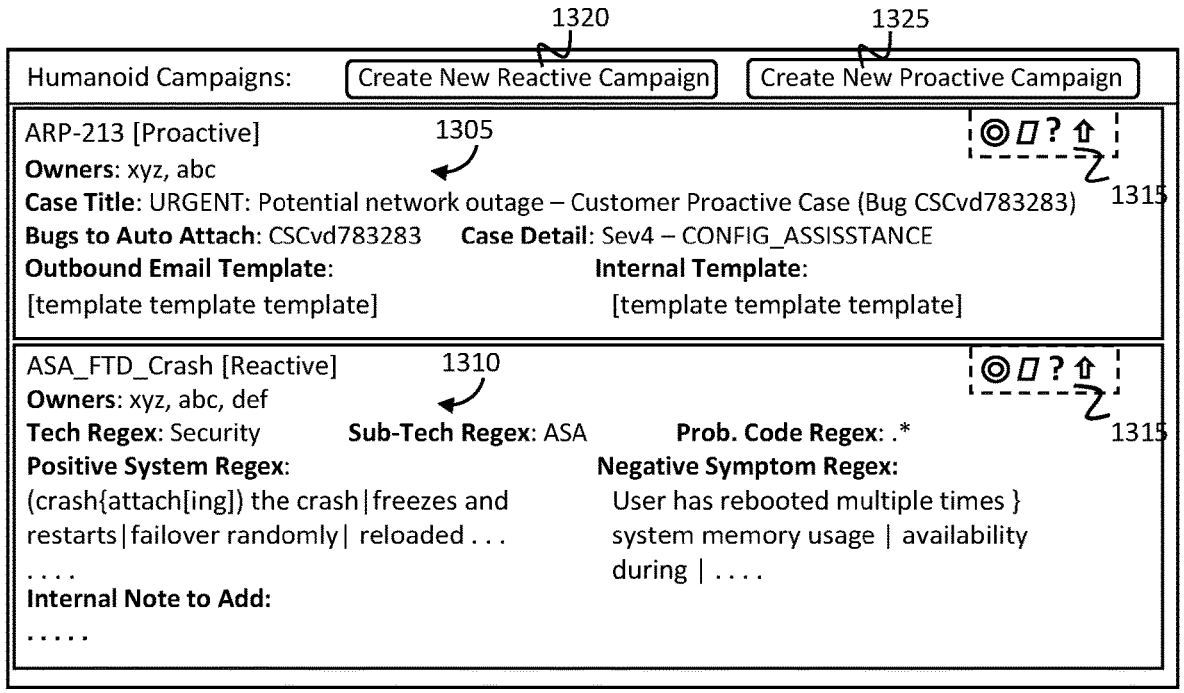
FIG. 13 is an example screenshot of a user interface displayed in connection with a campaign management operation of a humanoid system, according to an example embodiment.

FIG. 13 is an example screenshot of a user interface 1300 displayed in connection with a campaign management operation of a humanoid system, according to an example embodiment. For example, the user interface 1300 can be displayed to a human operator interacting with a campaign management module of the humanoid system. The user interface 1300 presents information regarding one or more different customer support campaigns. For example, the user interface 1300 depicted in FIG. 13 presents information in a first section 1305 regarding an "ARP-213" customer support campaign and information in a second section 1310 regarding an "ASA_FTD_Crash" customer support campaign.

The information presented can include any information related to the customer support campaign, such as an identity and/or contact information for one or more business or technical points of contact (or "owners") for the customer support campaign, technical information regarding the customer support campaign, such as symptoms, resolutions, associated bugs or other issues, one or more associated machine learning models and/or regex matching rules, one or more associated support cases, an indication regarding whether the customer support campaign is proactive vs. reactive, etc. A campaign can be considered "proactive," e.g., if it is created to document and/or address a support issue that is identified independent of any customer requests. For example, a proactive campaign can include support issues (like future equipment failures, outages, or other issues) that the humanoid, human operator, or another system or person, expect a customer to experience in the future. Similarly, a campaign can be considered "reactive" if is created in response to a customer request or other indication that the customer has encountered and/or detected the support issue. The human operator can view additional information, such as metrics associated with the customer support campaign, and/or take action in connection with the customer support campaign, by activating one or more icon inputs 1315. For example, the human operator can edit information regarding the customer support campaign, activate or deactivate the customer support campaign, or otherwise refine or redefine the customer support campaign via the inputs 1315.

The human operator also can create one or more new campaigns by activating a "create new reactive campaign" button 1320 or by activating a "create new proactive campaign button 1325. Activating one of these buttons (1320, 1325) can, e.g., enable the human operator to define a new campaign and activate it for use in provision of customer support. As would be recognized by a person of ordinary skill in the art, the user interface 1300 and the formatting, structure, and approach therein, are illustrative and should not be construed as being limiting in any way.

Figure 14:
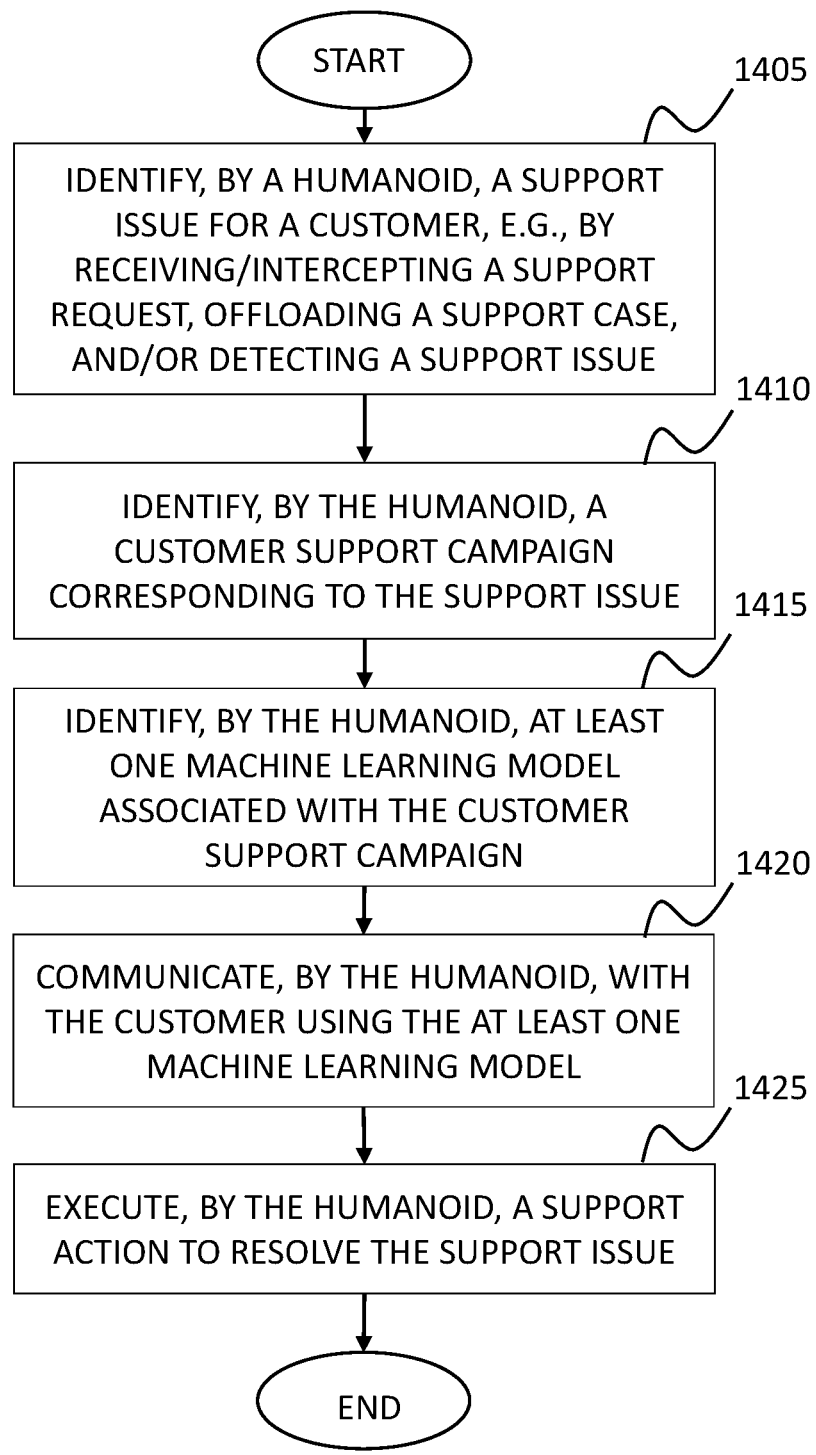
FIG. 14 is a flow chart of a method for providing automated customer support using a humanoid system, according to an example embodiment.

FIG. 14 is a flow chart of a method 1400 for providing automated customer support using a humanoid system, according to an example embodiment. In step 1405, a humanoid identifies a support issue for a customer. For example, a case assessment module of the humanoid can identify the support issue by receiving a support request from or on behalf of a customer, intercepting a support request directed to a human operator, taking over a support case previously being handled by a human operator (e.g., upon its own volition or at the request of the human operator or another person or system), or upon detecting (by the humanoid or another person or system) the support issue.

In step 1410, the humanoid identifies a customer support campaign corresponding to the support issue. Each customer support campaign is a different type of customer issue for which customer support may be provided. For example, there may be a customer support campaign for a network outage, a computer crash or other malfunction, a provision of software, hardware, a license, or an RMA, and/or any other type of support matter. For example, the case assessment module can execute step 1410 by determining a type of customer issue involved in the support issue and identifying a customer support campaign that corresponds to that type of customer issue.

In step 1415, the humanoid identifies at least one machine learning model associated with the customer support campaign. For example, each customer support campaign may have a different trained machine learning model for facilitating communications by the humanoid in connection with the customer support campaign. A module of the humanoid, such as the case assessment module, a case management module, a communications module, a campaign management module, or another module of the humanoid can identify the machine learning model(s) associated with the customer support campaign. For example, each machine learning model(s) may be stored and associated with one or more customer support campaigns in a database of, or associated with, the humanoid.

In step 1420, the humanoid communicates with the customer using the identified machine learning model(s). For example, the communications module of the humanoid may be configured to use the machine learning model(s) to mimic human dialogue, communicating like an actual human would, though potentially at a greater speed and with more accuracy than a human. Each communication can include an email, instant message, text message, webpage post (e.g., in a discussion forum), chat, voice communication (e.g., involving speech, speech-to-text transcription, and/or text-to-speech transcription), or another type of communication exchanged via an electronic medium.

In step 1425, the humanoid executes a support action to resolve the support issue. For example, the case management module, communications module, or a plugin execution module of the humanoid may be configured to execute one or more actions, and/or coordinate with one or more other systems, to resolve support issues. In an example embodiment, the plugin execution module can use one or more plugins to process, or cause another module/system to process, data provided by or for the customer, such as decoding a crash file to identify a specific bug causing a problem, recommending software versions, or completing another analysis. The analysis can be, e.g., more complex than an analysis that could ordinarily be completed by a human operator. For example, the analysis can involve complex calculations or tasks beyond simple question and answer capability. The plugin execution module also can (e.g., through one or more plugins and/or through cooperation with the communications module) coordinate provision of hardware or software items (e.g., in connection with a purchase order fulfillment, license depositing (or re-hosting), RMA, or other process), etc. The plugin execution module can cooperate with the communications module to cause status, instructions, and/or other information to be shared with the customer.

Noteworthy about the method 1400 depicted in the example of FIG. 14 is that the humanoid can be configured to resolve the support issue for the customer end-to-end without an actual human communicating with the customer. For example, the humanoid may provide automated support in a manner such that the customer receiving the support believes they are communicating directly with a human rather than a machine.

Figure 15:
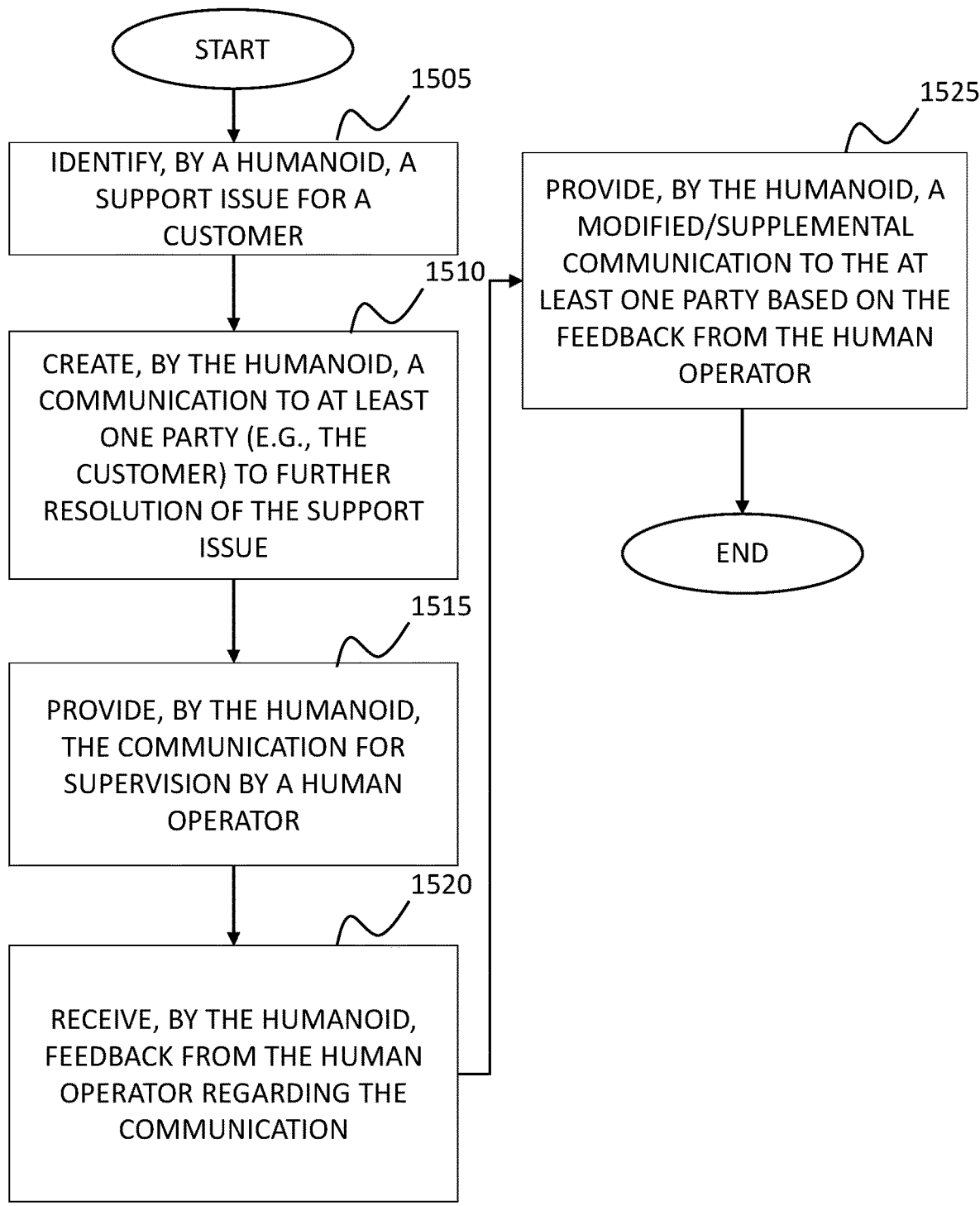
FIG. 15 is a flow chart of a method for a humanoid system receiving monitoring input while providing automated customer support, according to an example embodiment.

FIG. 15 is a flow chart of a method 1500 for a humanoid system receiving monitoring input while providing automated customer support, according to an example embodiment. In step 1505, the humanoid identifies a support issue for a customer. For example, a case assessment module of the humanoid can identify the support issue by receiving a support request from or on behalf of a customer, intercepting a support request directed to a human operator, taking over a support case previously being handled by a human operator (e.g., upon its own volition or at the request of the human operator or another person or system), or detecting (by the humanoid or another person or system) the support issue.

In step 1510, the humanoid creates a communication to at least one party to further resolution of the support issue. For example, a communications module of the humanoid can create the communication based on one or more machine learning models associated with a customer support campaign corresponding to the support issue. The communication can be in the form of an email, instant message, text message, webpage post (e.g., in a discussion forum), chat, voice communication (e.g., involving speech, speech-to-text transcription, and/or text-to-speech transcription), or another type of communication exchanged via an electronic medium. For example, the communication can be directed to the customer or another person or entity associated with the support issue.

In step 1515, the humanoid provides the communication for supervision by a human operator. For example, the communications module can provide the communication to a monitoring module, which can cause the communication to be displayed via a computing device of the human operator. The communications module can, e.g., echo the communication, which is simultaneously provided to the at least one other party or was previously provided to the at least one other party, or provide the (proposed) communication for supervision review before sending the communication to the at least one other party. The humanoid can provide the communication to the human operator via any electronic communication means, such as an interactive user interface, an email, instant message, text message, webpage post (e.g., in a discussion forum), chat, voice communication (e.g., involving speech, speech-to-text transcription, and/or text-to-speech transcription), or another type of communication exchanged via an electronic medium.

In step 1520, the humanoid receives feedback from the human operator regarding the communication. For example, the feedback can include one or more proposed modifications to the communication and/or proposed information to include in one or more supplemental communications. In step 1525, the humanoid provides a modified or supplemental communication to the at least one party based on the feedback from the human operator. For example, the humanoid can incorporate edits proposed by the human operator, e.g., through direct edits from the human operator and/or from a machine learning model or other logic utilized by the human operator. Thus, the customer can experience continuity of service by communicating only with the humanoid end-to-end, while quality and integrity of service is ensured through supervision by the human operator.

Figure 16:
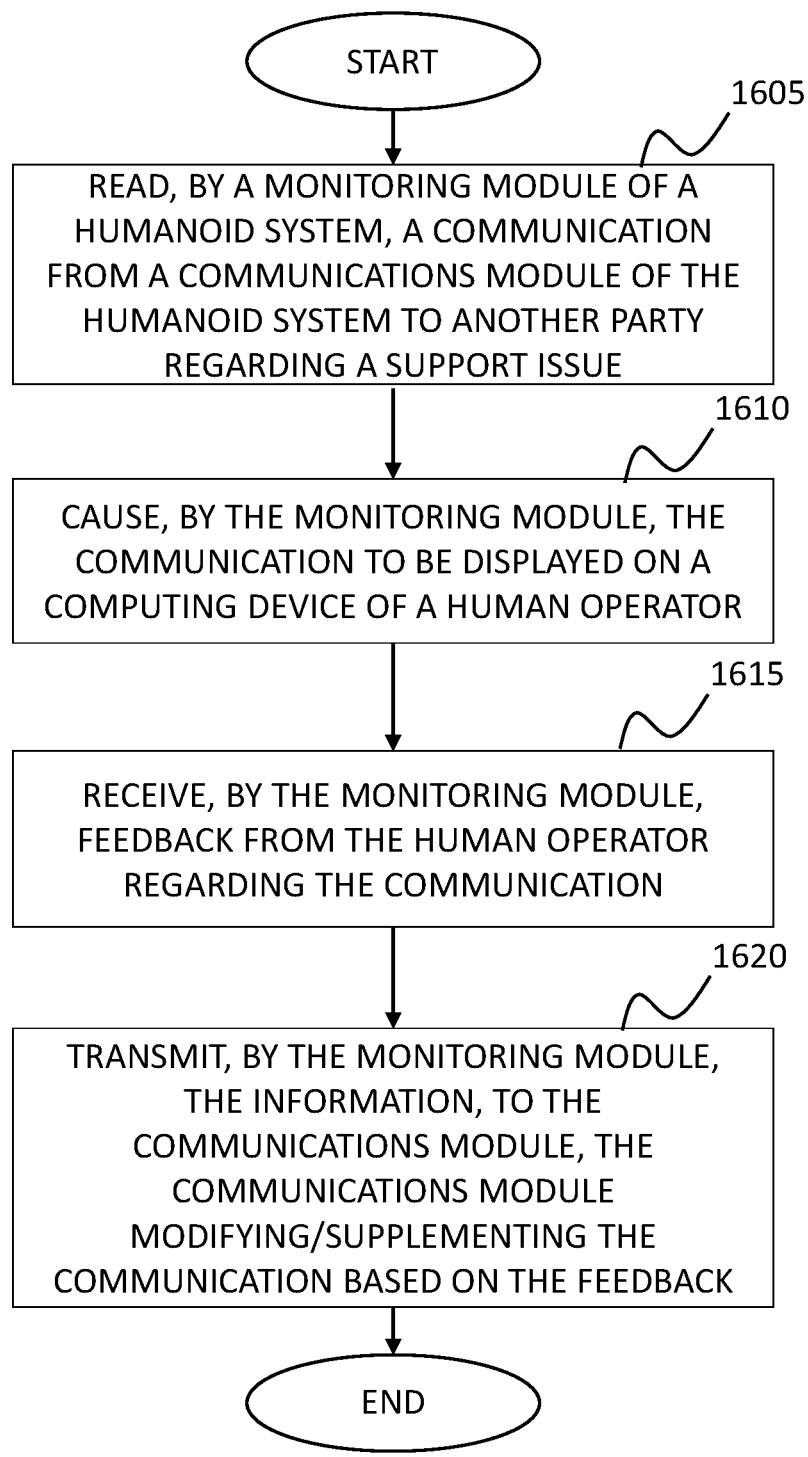
FIG. 16 is a flow chart of a method for monitoring a humanoid system providing automated customer support, according to an example embodiment.

FIG. 16 is a flow chart of a method 1600 for monitoring a humanoid system providing automated customer support, according to an example embodiment. In step 1605, a monitoring module of a humanoid system reads a communication from a communications module of the humanoid system to another party regarding a support issue. For example, the communications module of the humanoid can create the communication based on one or more machine learning models associated with a customer support campaign corresponding to the support issue. The communication can be in the form of an email, instant message, text message, webpage post (e.g., in a discussion forum), chat, voice communication (e.g., involving speech, speech-to-text transcription, and/or text-to-speech transcription), or another type of communication exchanged via an electronic medium. For example, the communication can be directed to the customer or another person or entity associated with the support issue.

In step 1610, the monitoring module causes the communication to be displayed on a computing device of a human operator. For example, the monitoring module can cooperate with the communications module to echo the communication, which is simultaneously provided to the other party or was previously provided to the other party, or provide the (proposed) communication for supervision review before sending the communication to the other party. The monitoring module can cause the communication to be displayed via any electronic means, such as an interactive user interface, an email, instant message, text message, webpage post (e.g., in a discussion forum), chat, voice communication (e.g., involving speech, speech-to-text transcription, and/or text-to-speech transcription), or another type of electronic medium.

In step 1615, the monitoring module receives feedback from the human operator regarding the communication. For example, the feedback can include one or more proposed modifications to the communication and/or proposed information to include in one or more supplemental communications. In step 1620, the monitoring module transmits the feedback to the communications module, which modifies and/or supplements the communication based on the feedback. For example, the humanoid can incorporate edits proposed by the human operator, e.g., through direct edits from the human operator and/or from a machine learning model or other logic utilized by the human operator.

As would be recognized by a person of skill in the art, the steps associated with the methods of the present disclosure, including method 1400, method 1500, and method 1600, may vary widely. Steps may be added, removed, altered, combined, and reordered without departing from the spirit or the scope of the present disclosure. Therefore, the example methods are to be considered illustrative and not restrictive, and the examples are not to be limited to the details given herein but may be modified within the scope of the appended claims.

Figure 17:
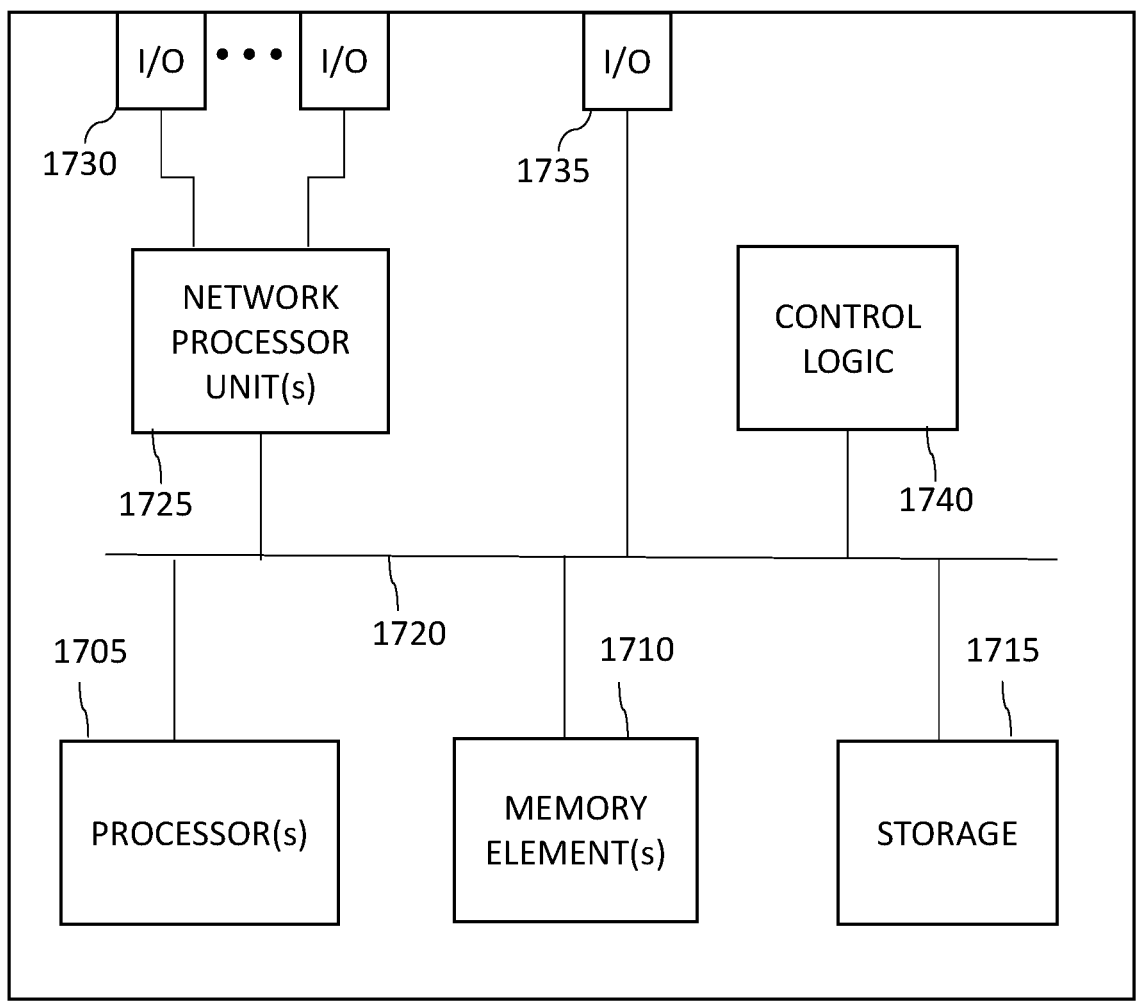
FIG. 17 is a block diagram of a computing device configured to perform the operations of a humanoid system to provide automated customer support, according to an example embodiment.

Referring to FIG. 17, FIG. 17 illustrates a hardware block diagram of a computing device 1700 that may perform functions associated with operations discussed herein in connection with the techniques depicted in FIGS. 1-16. In various example embodiments, a computing device, such as computing device 1700 or any combination of computing devices 1700, may be configured as any entity/entities as discussed for the techniques depicted in connection with FIGS. 1-16, such as the humanoid system 150, in order to perform operations of the various techniques discussed herein.

In at least one embodiment, computing device 1700 may include one or more processor(s) 1705, one or more memory element(s) 1710, storage 1715, a bus 1720, one or more network processor unit(s) 1725 interconnected with one or more network input/output (I/O) interface(s) 1730, one or more I/O interface(s) 1735, and control logic 1740. In various embodiments, instructions associated with logic for computing device 1700 can overlap in any manner and are not limited to the specific allocation of instructions and/or operations described herein.

In at least one embodiment, processor(s) 1705 is/are at least one hardware processor configured to execute various tasks, operations and/or functions for computing device 1700 as described herein according to software and/or instructions configured for computing device. Processor(s) 1705 (e.g., a hardware processor) can execute any type of instructions associated with data to achieve the operations detailed herein. In one example, processor(s) 1705 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1710 and/or storage 1715 is/are configured to store data, information, software, and/or instructions associated with computing device 1700, and/or logic configured for memory element(s) 1710 and/or storage 1715. For example, any logic described herein (e.g., control logic 1740) can, in various embodiments, be stored for computing device 1700 using any combination of memory element(s) 1710 and/or storage 1715. Note that in some embodiments, storage 1715 can be consolidated with memory element(s) 1710 (or vice versa), or can overlap/exist in any other suitable manner.

In at least one embodiment, bus 1720 can be configured as an interface that enables one or more elements of computing device 1700 to communicate in order to exchange information and/or data. Bus 1720 can be implemented with any architecture designed for passing control, data and/or information between processors, memory elements/storage, peripheral devices, and/or any other hardware and/or software components that may be configured for computing device 1700. In at least one embodiment, bus 1720 may be implemented as a fast kernel-hosted interconnect, potentially using shared memory between processes (e.g., logic), which can enable efficient communication paths between the processes.

In various embodiments, network processor unit(s) 1725 may enable communication between computing device 1700 and other systems, entities, etc., via network I/O interface(s) 1730 to facilitate operations discussed for various embodiments described herein. In various embodiments, network processor unit(s) 1725 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1700 and other systems, entities, etc. to facilitate operations for various embodiments described herein. In various embodiments, network I/O interface(s) 1730 can be configured as one or more Ethernet port(s), Fibre Channel ports, and/or any other I/O port(s) now known or hereafter developed. Thus, the network processor unit(s) 1725 and/or network I/O interfaces 1730 may include suitable interfaces for receiving, transmitting, and/or otherwise communicating data and/or information in a network environment.

I/O interface(s) 1735 allow for input and output of data and/or information with other entities that may be connected to computer device 1700. For example, I/O interface(s) 1735 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1740 can include instructions that, when executed, cause processor(s) 1705 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1740) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1710 and/or storage 1715 can store data, software, code, instructions (e.g., processor instructions), logic, parameters, combinations thereof, and/or the like used for operations described herein. This includes memory element(s) 1710 and/or storage 1715 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, in one form, a computer-implemented method includes identifying, by a humanoid of a customer support system, a customer support campaign corresponding to a support issue for a customer. The humanoid comprises a computer executed process that mimics human dialog. The humanoid can identify at least one machine learning model associated with the customer support campaign. The humanoid can communicate with the customer using the at least one machine learning model. The humanoid can execute a support action to resolve the support issue. For example, the humanoid can resolve the support issue without the human operator communicating with the customer.

Identifying the customer support campaign can comprise, for example, selecting a particular customer support campaign from a plurality of customer support campaigns based on a type of problem corresponding to the support issue, the at least one machine learning model being trained specifically for the particular customer support campaign. For example, a support request from a customer to a human operator can be intercepted in response to a determination by the humanoid that the humanoid is capable of handling the support request, the support issue corresponding to the support request. In addition, or in the alternative, a human operator can request for the humanoid to take over handling of the support issue, or the humanoid can detect, and notify the customer of, the support issue.

Executing the support action can include, for example, cooperating with at least one system external to the humanoid to resolve the support issue. In addition, or in the alternative, executing the support action can include causing a license to be deposited into an online account for the customer and/or facilitating provision of an item to the customer.

The humanoid communicating with the customer can include, e.g., echoing each communication to a monitoring system for supervision by a human operator. In addition, or in the alternative, the humanoid can create a communication to the customer, receive information from a human operator regarding a modification to be made to the communication, and provide a modified communication to the customer based on the information from the human operator. The at least one machine learning model may be updated based on input from a human operator supervising the humanoid.

In another form, an apparatus comprises a communication interface configured to enable network communications, and one or more memories configured to store data. The apparatus further comprises one or more processors coupled to the communication interface and memory and configured to perform operations including: identifying a customer support campaign corresponding to a support issue for a customer; identifying at least one machine learning model associated with the customer support campaign; communicating with the customer using the at least one machine learning model, the communicating mimicking human dialog; and executing a support action to resolve the support issue.

In another form, one or more non-transitory computer readable storage media include instructions that, when executed by at least one processor, are operable to: identify a customer support campaign corresponding to a support issue to be handled on behalf of a customer; identify at least one machine learning model associated with the customer support campaign; communicate with the at least one machine learning model, at least one outbound communication mimicking human dialog; and execute a support action to resolve the support issue.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of,' 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A system comprising:
 a case assessment module, implemented at least partially in hardware, configured to:
  obtain information associated with an incoming request from a user to resolve a support issue;
  identify a support campaign corresponding to the support issue;
  determine that a database that stores machine learning models includes one or more trained machine learning models for the support campaign; and
  determine that the system is capable of resolving the support issue based on determining that the database includes the one or more trained machine learning models;
 a communications module, implemented at least partially in hardware, configured to:
  communicate with the user using the one or more trained machine learning models to mimic human dialog; and
 a plugin execution module, implemented at least partially in hardware, configured to:
  activate a plugin to debug a crash file associated with the user to identify a cause of the support issue;
  identify hardware or software items to resolve the support issue; and
  provision the hardware or software items to resolve the support issue.

2. The system of claim 1, wherein, when determining that the system is capable of resolving the support issue, the case assessment module is further configured to determine that the system is capable of resolving the support issue when a confidence score for addressing the support issue is above a threshold.

3. The system of claim 1, wherein the case assessment module is further configured to communicate with the communications module and the plugin execution module to resolve the support issue.

4. The system of claim 1, further comprising a training module configured to train the one or more trained machine learning models.

5. The system of claim 1, wherein the case assessment module is further configured to:
 determine whether enough information has been obtained to take action to resolve the support issue; and
 coordinate with the communications module to obtain additional information from the user when enough information has not been obtained.

6. The system of claim 1, wherein the plugin execution module is further configured to use an application program interface to process data provided by the user or cause another system to process the data provided by the user to resolve the support issue.

7. The system of claim 1, wherein the case assessment module is further configured to coordinate updates to the one or more trained machine learning models.

8. A computer-implemented method comprising:
 obtaining, at a case assessment module of a customer support system, information associated with an incoming request from a user to resolve a support issue;
 identifying, by the case assessment module, a support campaign corresponding to the support issue;
 determining, by the case assessment module, that a database that stores machine learning models includes one or more trained machine learning models for the support campaign;
 determining, by the case assessment module, that the customer support system is capable of resolving the support issue based on determining that the database includes the one or more trained machine learning models;
 communicating, by a communications module of the customer support system, with the user using the one or more trained machine learning models to mimic human dialog;
 activating, by a plugin execution module of the customer support system, a plugin to debug a crash file associated with the user to identify a cause of the support issue;
 identifying, by the plugin execution module, hardware or software items to resolve the support issue; and
 provisioning, by the plugin execution module, the hardware or software items to resolve the support issue.

9. The computer-implemented method of claim 8, wherein determining that the customer support system is capable of resolving the support issue comprises determining that the customer support system is capable of resolving the support issue when a confidence score for addressing the support issue is above a threshold.

10. The computer-implemented method of claim 8, further comprising:
 communicating, by the case assessment module, with the communications module and the plugin execution module to resolve the support issue.

11. The computer-implemented method of claim 8, further comprising training, by a training module, the one or more trained machine learning models.

12. The computer-implemented method of claim 8, further comprising:
 determining, by the case assessment module, whether enough information has been obtained to take action to resolve the support issue; and
 coordinating, by the case assessment module, with the communications module to obtain additional information from the user when enough information has not been obtained.

13. The computer-implemented method of claim 8, further comprising:

using, by the plugin execution module, an application program interface to process data provided by the user or cause another system to process the data provided by the user to resolve the support issue.

14. The computer-implemented method of claim 8, further comprising coordinating, by the case assessment module, updates to the one or more trained machine learning models.

15. One or more non-transitory computer readable storage media comprising instructions that, when executed by at least one processor associated with a customer support system, are operable to:

obtain information associated with an incoming request from a user to resolve a support issue;

identify a support campaign corresponding to the support issue;

determine that a database that stores machine learning models includes one or more trained machine learning models for the support campaign;

determine that the customer support system is capable of resolving the support issue based on determining that the database includes the one or more trained machine learning models;

communicate with the user using the one or more trained machine learning models to mimic human dialog;

activate a plugin to debug a crash file associated with the user to identify a cause of the support issue;

identify hardware or software items to resolve the support issue; and provision the hardware or software items to resolve the support issue.

16. The one or more non-transitory computer readable storage media of claim 15, wherein, when determining that the customer support system is capable of resolving the support issue, the instructions are further operable to determine that the customer support system is capable of resolving the support issue when a confidence score for addressing the support issue is above a threshold.

17. The one or more non-transitory computer readable storage media of claim 15, wherein the instructions are further operable to train the one or more trained machine learning models.

18. The one or more non-transitory computer readable storage media of claim 15, wherein the instructions are further operable to:

determine whether enough information has been obtained to take action to resolve the support issue; and obtain additional information from the user when enough information has not been obtained.

19. The one or more non-transitory computer readable storage media of claim 15, wherein the instructions are further operable to:

use an application program interface to process data provided by the user or cause another system to process the data provided by the user to resolve the support issue.

20. The one or more non-transitory computer readable storage media of claim 15, wherein the instructions are further operable to:

coordinate updates to the one or more trained machine learning models.

\* \* \* \* \*